US006765947B2

(12) United States Patent
Kumkar

(10) Patent No.: US 6,765,947 B2
(45) Date of Patent: Jul. 20, 2004

(54) LASER AMPLIFYING SYSTEM

(75) Inventor: Malte Kumkar, Schramberg (DE)

(73) Assignee: TRUMPF Laser GmbH + Co. KG, Schramberg (DE)

( * ) Notice: Subject to any disclaimer, the term of this patent is extended or adjusted under 35 U.S.C. 154(b) by 27 days.

(21) Appl. No.: 10/214,427

(22) Filed: Aug. 6, 2002

(65) Prior Publication Data

US 2003/0058915 A1 Mar. 27, 2003

(30) Foreign Application Priority Data

Aug. 9, 2001 (DE) .......................................... 101 40 254

(51) Int. Cl.[7] .............................................. H01S 3/10
(52) U.S. Cl. .............................. 372/93; 372/9; 372/70; 372/108
(58) Field of Search ............................. 372/108, 25, 9, 372/70, 93, 100, 106, 92

(56) References Cited

U.S. PATENT DOCUMENTS 5,553,088 A    9/1996   Brauch et al. ................. 372/34

FOREIGN PATENT DOCUMENTS

| DE | 199 25 648 | 12/2000 |
|---|---|---|
| DE | 100 54 289 | 2/2002 |
| EP | 0 632 551 | 1/1995 |

Primary Examiner—James W. Davie
(74) Attorney, Agent, or Firm—Barry R. Lipsitz

(57) ABSTRACT

In order to improve a laser amplifying system comprising a solid-state member having a laser-active medium, a radiation field system determined by an optical guide means for the radiation field and an actively switchable, optical switching element arranged in the radiation field system for influencing the losses in the radiation field system in such a manner that this is suitable for low-amplification laser-active media, it is suggested that the solid-state member be designed like a thin plate, the radiation field system comprise an incoming branch and an outgoing branch which are coupled to one another, on the one hand, and between which, on the other hand, an amplifying radiation field is provided which is formed from a plurality of intermediate branches which extend between two optical beam reversing elements and, for their part, all penetrate the solid-state member in a direction transverse to its flat sides and within an active volume area, and that the active volume area have in directions transverse to beam axes of the intermediate branches an extension which corresponds at the most to three times the average extension of the radiation field cross sections of the volume sections of the intermediate branches located in the active volume area.

41 Claims, 13 Drawing Sheets

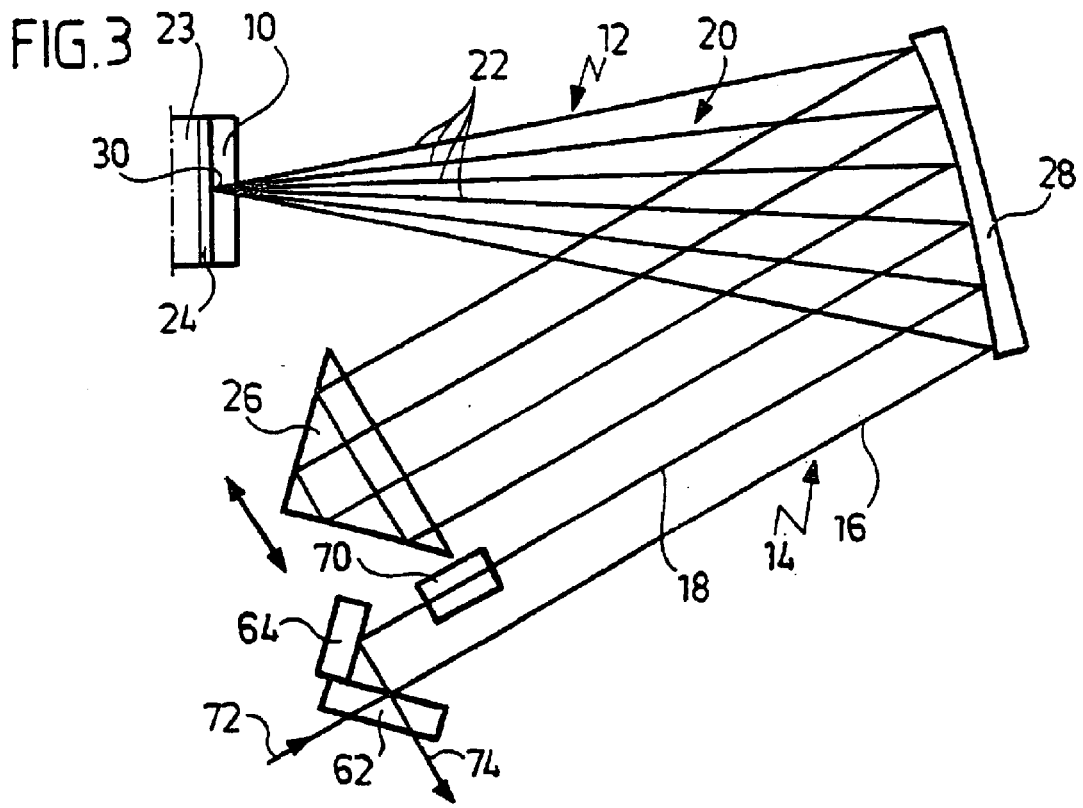
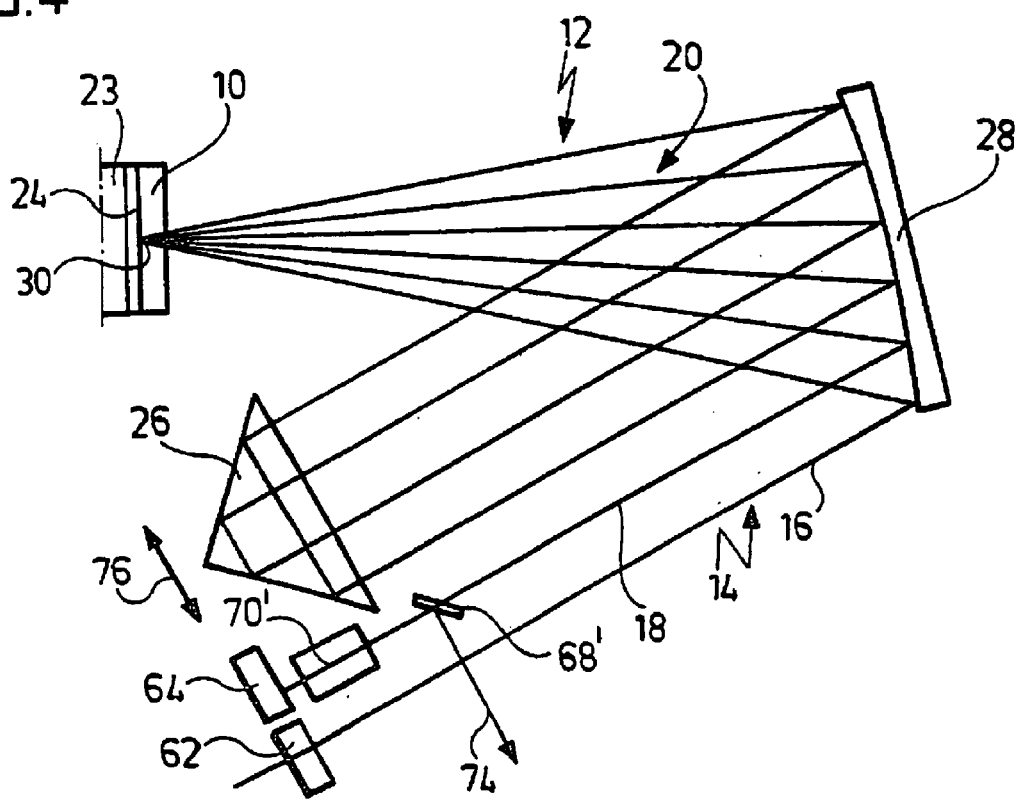

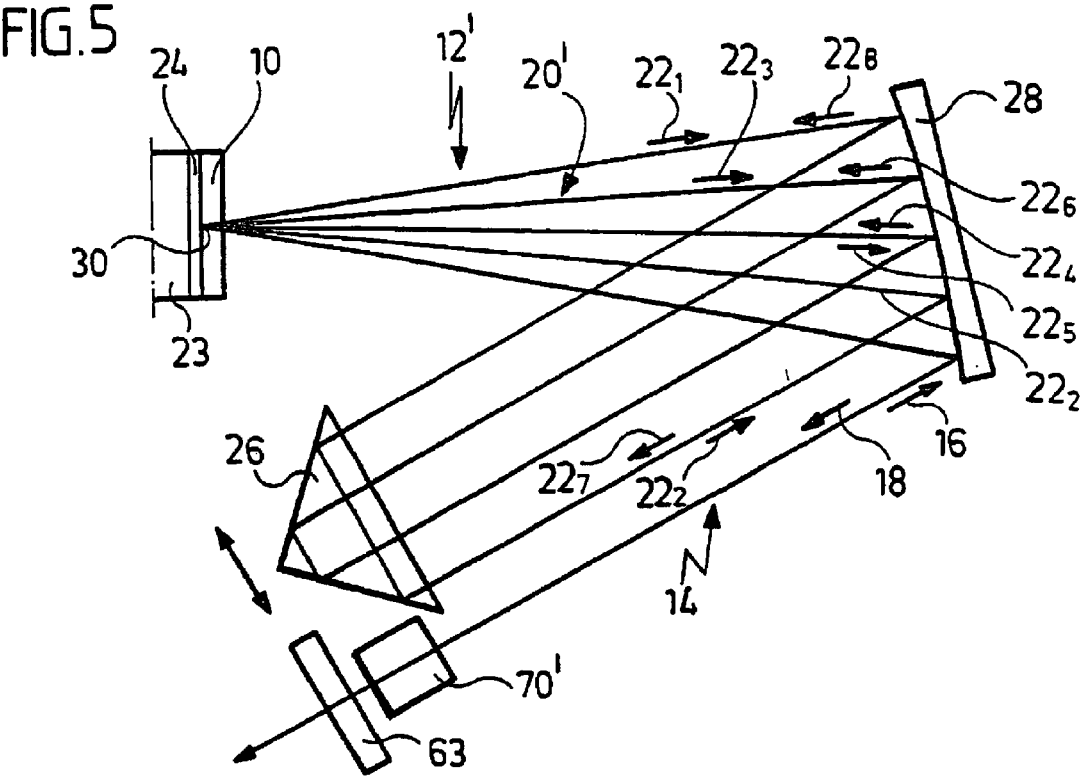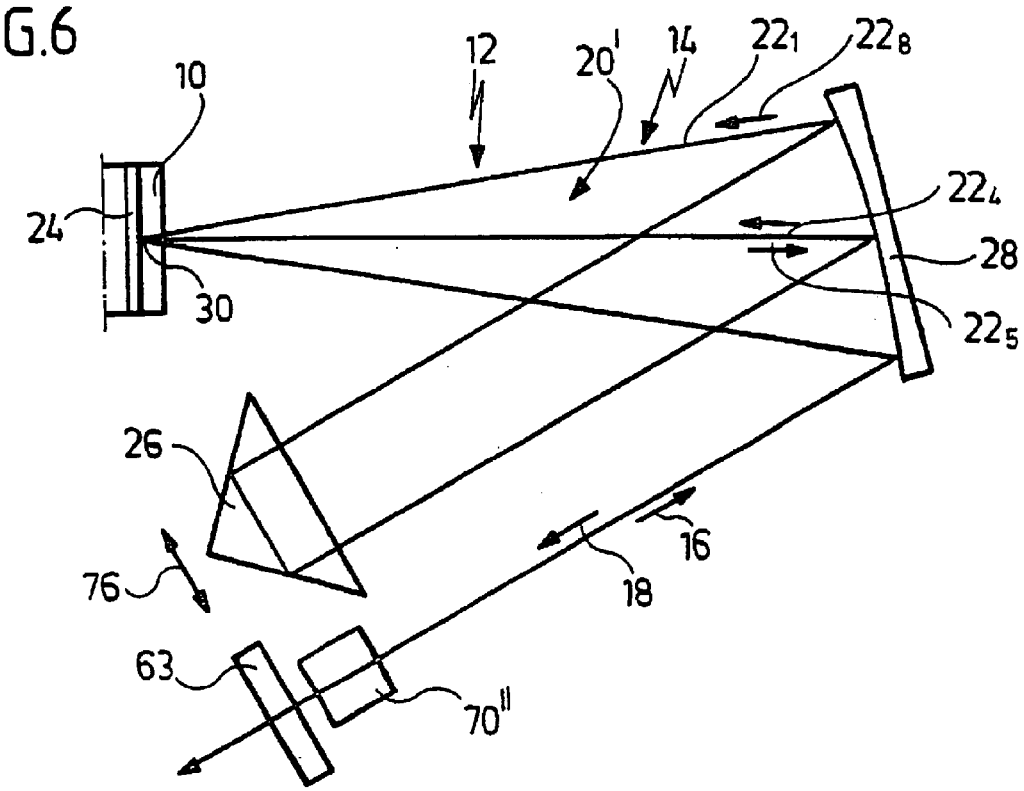

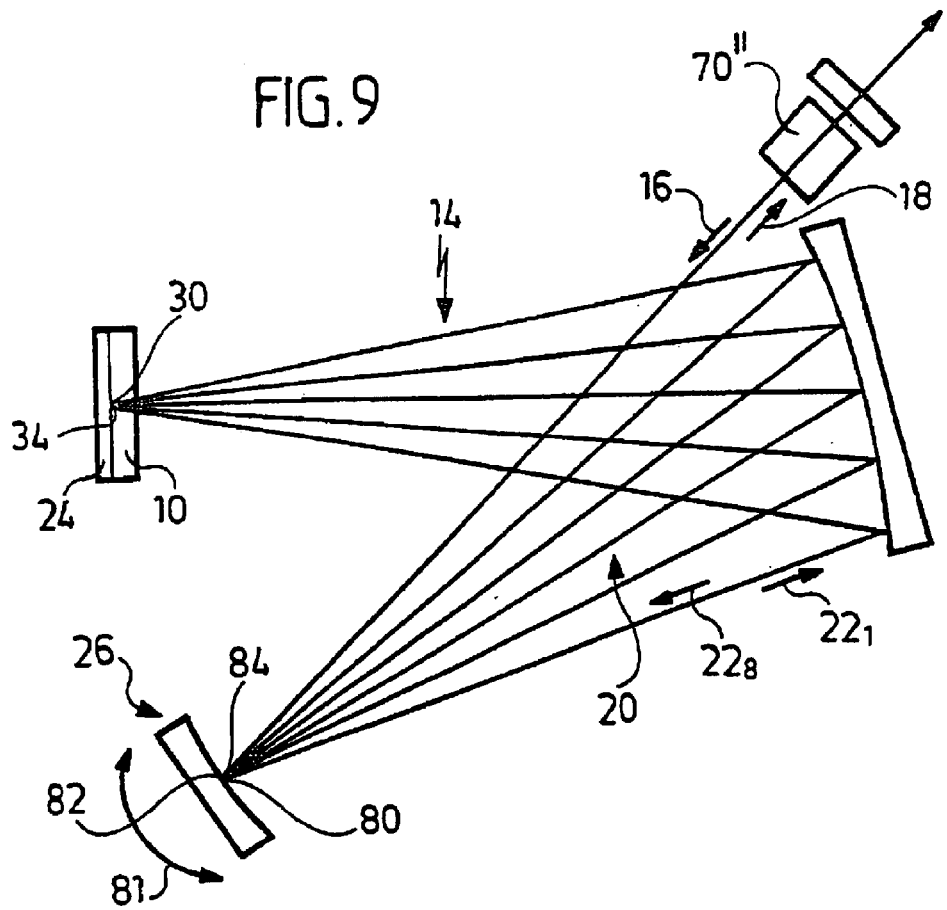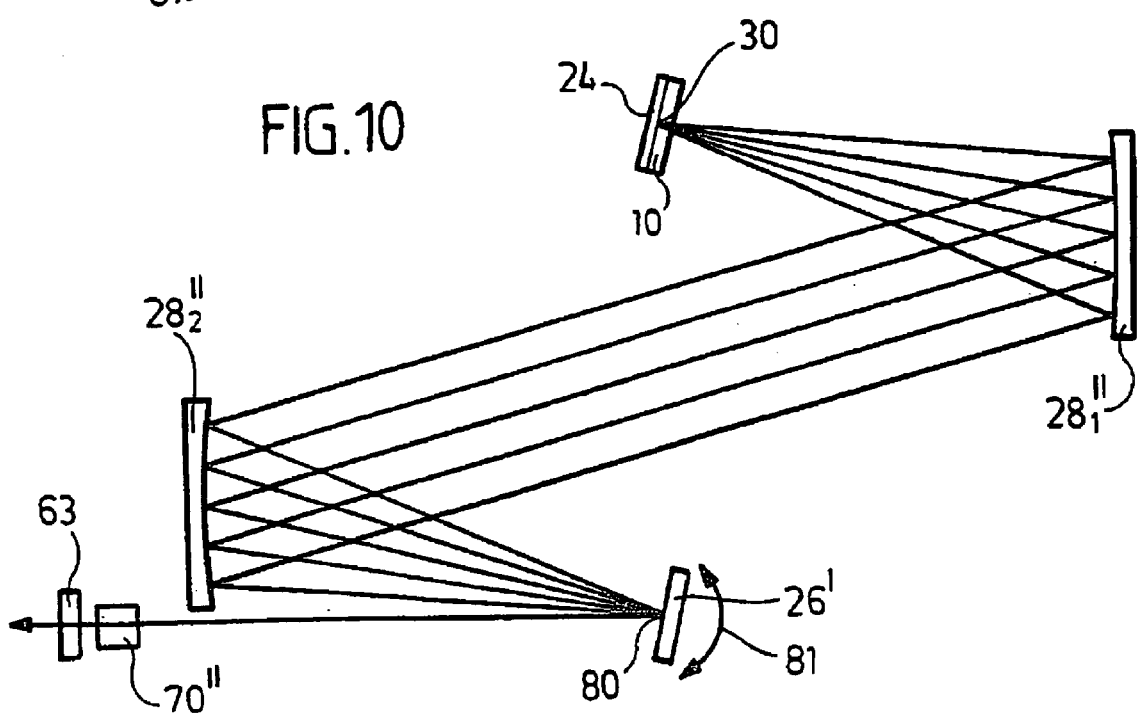

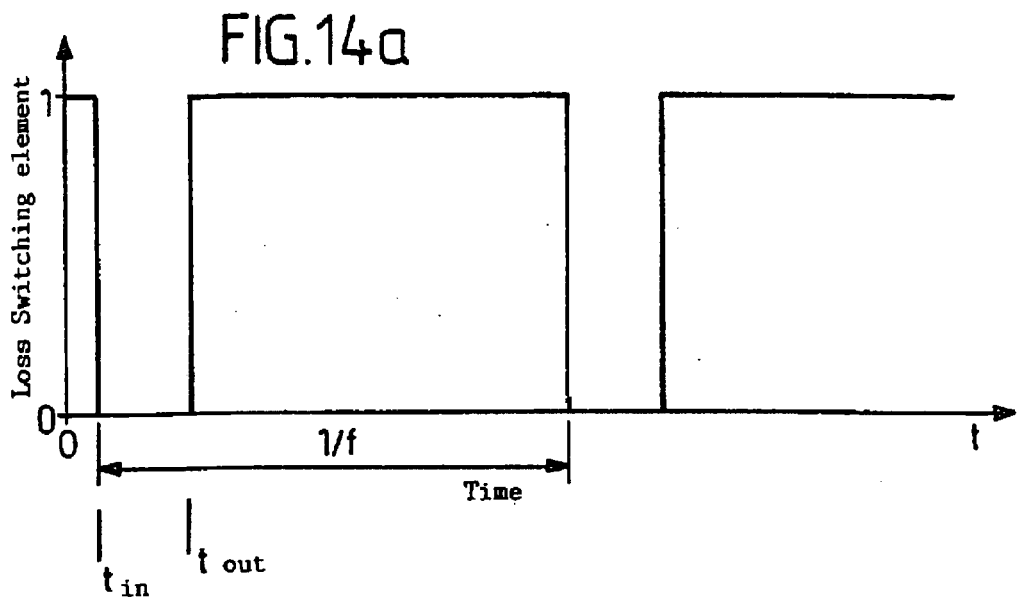
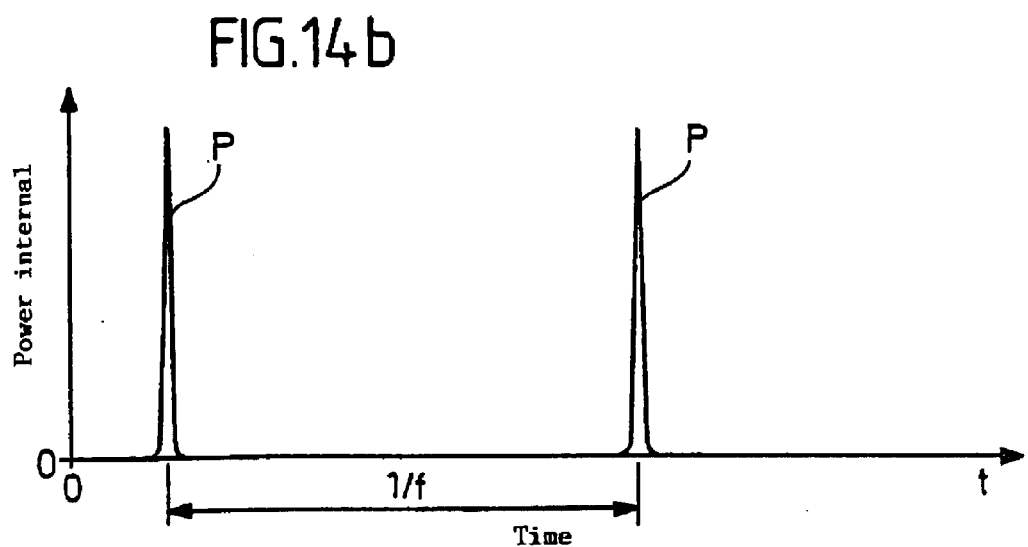
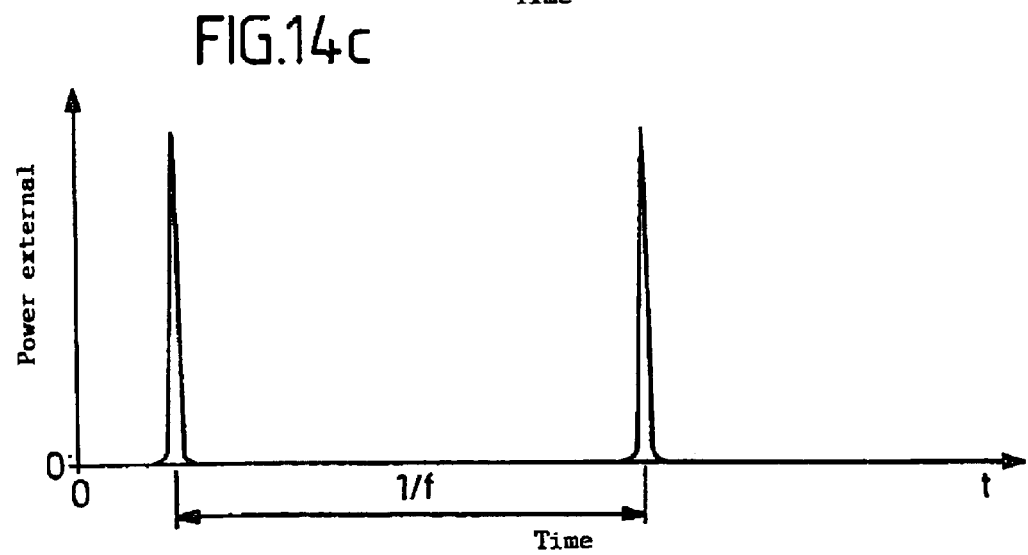

LASER AMPLIFYING SYSTEM

The invention relates to a laser amplifying system with a solid-state member having a laser-active medium and with a radiation field system determined by an optical guide means for the radiation field and an actively switchable optical switching element arranged in the radiation field system for influencing the losses in the radiation field system.

Laser amplifying systems of this type are known from the state of the art, wherein during a pass through the radiation field system not only the optical switching element but also the solid-state member having the laser-amplifying medium are normally passed through once.

Since an optical switching element can never be switched free from losses but always has a minimum loss for laser radiation passing through it, this design for laser amplifying systems with a low-amplification laser-active medium is a problem.

The object underlying the invention is therefore to improve a laser amplifying system of the generic type in such a manner that this is suitable for low-amplification laser-active media.

This object is accomplished in accordance with the invention, in a laser amplifying system of the type described at the outset, in that the solid-state member is designed like a thin plate, that the radiation field system comprises an incoming branch and an outgoing branch which are, on the one hand, coupled to one another and between which, on the other hand, an amplifying radiation field is provided which is formed from a plurality of intermediate branches which extend between two optical beam reversing elements and, for their part, all penetrate the solid-state member in a direction transverse to its flat sides and within a volume area, wherein the active volume area has, in directions transverse to beam axes of the intermediate branches, an extension which corresponds at the most to three times the average extension of the radiation field cross sections of the volume sections of the intermediate branches located in the active volume area.

The advantage of the inventive solution is, therefore, to be seen in the fact that due to the provision of the amplifying radiation field with the intermediate branches a high amplification is possible with a multiple pass through the solid-state member designed like a thin plate without the respective losses of the actively switchable optical element having a negative effect on the amplification and without the beam quality suffering.

In addition, the advantage of the inventive solution is also to be seen in the fact that, with it, a large optical path length of the amplifying radiation field can be realized between the respective passes through the switching element and so, as a result, it is possible to use a switching element which operates slowly, for example, in the microsecond range with switching flanks in the range of more than ten nanoseconds.

A solid-state member which is designed like a thin plate is to be understood in accordance with the invention as a solid-state member, the flat sides of which have an extension which is at least ten times, even better one hundred times, the thickness thereof.

Solid-state members which are designed like thin plates and can customarily be used are described, for example, in European patent application No. 0 632 551.

With respect to the arrangement of the actively switchable optical switching element, the most varied of possibilities are conceivable. For example, it would, in principle, be conceivable to arrange the actively switchable optical switching element in one of the intermediate branches of the amplifying radiation field.

It is particularly favorable when the actively switchable optical switching element is arranged outside the amplifying radiation field.

One advantageous solution provides, in this respect, for the actively switchable optical switching element to be arranged in the incoming or outgoing branch of the radiation field system.

In principle, it is sufficient in the inventive solution to provide an amplifying radiation field with a plurality of intermediate branches. If, however, the optical path length of the radiation field system is intended to be maximized, it is also conceivable for the radiation field system to have at least two amplifying radiation fields and for two beam reversing elements to be associated with each amplifying radiation field, wherein both amplifying radiation fields can also extend between the same beam deflecting elements.

With respect to the number of volume areas having a laser-active medium, it is likewise advantageous when providing several amplifying radiation fields when different volume areas having a laser-active medium are associated with the different amplifying radiation fields.

With respect to the construction of the radiation field optical guide means for determining the amplifying radiation field, the most varied of possibilities are conceivable. A particularly favorable solution, in particular, with respect to the transfer properties from intermediate branch to intermediate branch provides for at least one transfer element arranged between the beam reversing elements to be associated with each amplifying radiation field, this transfer element preferably bringing the beam axes of the intermediate branches together in an area of intersection, in which they overlap with their radiation field cross sections at least by half.

It is even better when the intermediate branches overlap with their radiation field cross sections in the area of intersection by at least two thirds, even better overlap for the most part.

The transfer element may, in this respect, be a transfer element operating in transmission. It is, however, particularly favorable when the transfer element is designed to reflect the intermediate branches since such a transfer element allows operations with small losses.

A particularly advantageous variation of a transfer element designed to be reflecting provides for this to be designed as a reflector with a curved reflection surface and, therefore, represent at the same time a folding element for the intermediate branches.

The transfer element may, in principle, have different imaging properties. One particularly advantageous solution provides for the transfer element to be designed as a transfer element acting in a collimating manner for the beam axes of the intermediate branches, i.e., allowing intermediate branches proceeding from an area of intersection to extend parallel to one another following the imaging.

An alternative development likewise preferred within the scope of the inventive solution provides for the transfer element to be designed as a transfer element bringing the beam axes of the intermediate branches together twice in an area of intersection, i.e., the transfer element causes intermediate branches proceeding from an area of intersection to run together again in an area of intersection due to imaging.

The provision of one transfer element acting on the intermediate branches between the beam reversing elements is, in this respect, not a final determination; within the scope of the inventive solution it is also conceivable to provide several transfer elements, depending on the transfer to be carried out.

In the same way, the determination of two beam reversing elements is merely a minimum condition for the determination of the respective amplifying radiation field. It is also conceivable within the scope of the invention to provide additional deflecting elements, for example, multiple deflection elements.

With respect to the beam reversing elements, no further details have been given in conjunction with the preceding explanations concerning the individual embodiments.

The beam reversing elements are preferably designed such that at least some of the intermediate branches extend in the amplifying radiation field, to a great extent, spatially separated.

A favorable variation provides for intermediate branches to extend essentially spatially separate from one another.

Another solution provides for two respective intermediate branches to coincide geometrically but to extend with different directions of radiation propagation.

For example, the beam reversing elements reflect several times, i.e., for example, are designed to reflect twice and convert one intermediate branch into a next intermediate branch extending at a distance from it.

However, a particularly favorable solution provides for at least one of the beam reversing elements to be designed as a single-reflection reflector and, therefore, to convert one intermediate branch as a result of a one-time reflection into the next intermediate branch which can either coincide geometrically with the incoming intermediate branch or extend at an angle to it.

The advantage of this solution is, on the one hand, that the losses during the reflection can be minimized. On the other hand, the advantage is also that, as a result, one intermediate branch can, in a simple manner, be converted into an intermediate branch coinciding with it geometrically but propagating in the opposite direction in a simple manner.

In this respect, it is particularly advantageous when both beam reversing elements are designed as single-reflection reflectors.

In the case where the beam reversing element is designed as a single-reflection reflector, it is particularly advantageous when the intermediate branches impinge on the reflector in a surface area with their radiation field cross sections overlapping so that they are reflected back from this surface area which represents an area of intersection.

With respect to the course of the intermediate branches in the active volume area, no further specific details have been given in conjunction with the preceding embodiments. It is particularly favorable when the intermediate branches essentially overlap with their volume sections penetrating the active volume area in order to achieve as effective a coupling as possible to the same excited volume area in the solid-state member as a result.

This coupling may be brought about in a particularly favorable manner when the optical guide means for the radiation field is designed in such a manner that the intermediate branches each have an approximately similar radiation field geometry in the active volume area and, therefore, are coupled to the laser-active volume area in as efficient a form as possible.

In order to achieve transfer ratios in the radiation field system which are as good as possible, the optical guide means for the radiation field is preferably designed in such a manner that the beam axes of the intermediate branches penetrate a volume of intersection which is located in a spatial area comprising the active volume area, is smaller than the active volume area by at least a factor of 10, even better a factor of 100, and the extension of which in the individual spatial directions is preferably smaller than the extension of the active volume area in the individual spatial directions by a factor of 10, even better 100.

This means that the volume of intersection is intended to be located either in the active volume area or close to it.

In order to limit the spatial area, in which the volume of intersection is preferably located, it is preferably provided for the spatial area to have in every direction a maximum extension which corresponds to double the maximum extension of the active volume area so that the active volume area is always located close to the volume of intersection.

A particularly favorable solution provides for the solid-state member having the laser-active medium to be arranged directly in front of the beam reversing element, on which the intermediate branches overlap in the surface area with their radiation cross sections.

In order to obtain conditions which are as optimum as possible, it is preferably provided for the optical guide means for the radiation field to be designed in such a manner that the intermediate branches with approximately the same beam propagation direction have an identical symmetry with an identical alignment of symmetry within the active volume area.

This means that the amplifying radiation field is designed in this case such that each intermediate branch has the same symmetry within the active volume area and is also aligned such that the directions of symmetry essentially coincide.

Furthermore, an advantageous solution provides for the optical guide means for the radiation field to be designed in such a manner that the intermediate branches with approximately the same beam propagation direction have approximately the same phase curvature in the active volume area so that phase distortions from intermediate branch to intermediate branch are avoided.

In this respect, it is particularly favorable when the optical guide means for the radiation field is designed in such a manner that the intermediate branches with approximately the same beam propagation direction have conjugated surfaces located in a spatial area comprising the active volume area.

In this respect, the spatial area is preferably defined in such a manner that this has in every direction a maximum extension which corresponds to double the maximum extension of the active volume area in this direction.

Particularly favorable imaging conditions result, in addition, when the optical guide means for the radiation field is designed in such a manner that the amplifying radiation field behaves like an afocal system within the active volume. In order to achieve distortions in the radiation field which are as slight as possible, it is preferably provided for the optical guide means for the radiation field to be designed in such a manner that a different intermediate branch with an imaging magnification of approximately one is formed from each of the intermediate branches.

Since, in the case of the inventive solution, the number of intermediate branches determines the optical path length in the amplifying radiation field and pulse duration and repetitive frequency influence this optical path length in pulsed operation for the propagating times, it is preferably provided for the number of intermediate branches to be adjustable due to adjustment relative to one another of the elements of the optical guide means for the radiation field defining the amplifying radiation field.

This may be realized particularly favorably when the number of intermediate branches can be adjusted due to adjustment of one of the beam reversing elements relative to the other, stationarily arranged elements of the optical guide means for the radiation field.

No further details have so far been given with respect to the path of the incoming branch relative to the elements of the optical guide means for the radiation field. One advantageous embodiment provides, for example, for the incoming branch to extend between an end element of the optical guide means for the radiation field and one of the two beam reversing elements.

Also with respect to the arrangement of the outgoing branch, no further details have so far been given. It is expedient when the outgoing branch extends between an end element of the optical guide means for the radiation field and one of the beam reversing elements.

A particularly expedient solution provides for the incoming branch and the outgoing branch to extend towards the same beam reversing element.

No further details have so far been given with respect to the coupling between the incoming branch and the outgoing branch. The coupling can be realized, for example, in the most varied of ways.

One advantageous possibility provides for the incoming branch and the outgoing branch to be coupled directly by means of the end elements, i.e., the end elements are arranged such that they transfer the incoming and the outgoing branches directly into one another.

For example, this is possible due to the fact that the end elements couple the outgoing branch and the incoming branch by way of reflection.

This is possible, on the one hand, due to the fact that the incoming branch and the outgoing branch extend at a distance to one another and are coupled by means of reflecting end elements arranged in a suitable manner.

Another possibility provides for the incoming branch and the outgoing branch to extend towards the same end element and to be arranged such that they coincide geometrically so that the incoming branch results again due to reflection back of the outgoing branch.

No further details have so far been given with respect to the design of the radiation field system and the propagation of the laser radiation in the radiation field system.

One advantageous embodiment, for example, provides for laser radiation to be able to pass through the radiation field system several times in the same direction of pass.

An alternative solution to this provides for the radiation field system to be designed such that laser radiation can pass through the radiation field system in opposite directions due to a reversal of direction in the incoming and/or outgoing branch.

No further details have so far been given with respect to the coupling of the laser radiation out of the radiation field system. One advantageous embodiment, for example, provides for part of the laser radiation to be constantly coupled out in the radiation field system, i.e., for the laser radiation coupled out to always correspond to an approximately constant proportion of the laser radiation in the radiation field system.

This may be achieved, for example, due to the fact that the laser radiation can be coupled out by an element of the optical guide means for the radiation field which is designed, for example, as a partially transparent mirror.

Another advantageous solution provides for laser radiation to pass through the radiation field system for such a time until an active coupling out is brought about by means of the optical switching element.

In this case, the optical switching element serves not only to influence the losses in the radiation field system but, at the same time, to couple laser radiation out of the radiation field system in an actively controlled manner.

For this purpose, the actively switchable optical switching element may be designed in the most varied of ways.

One advantageous possibility provides, for example, for the actively switchable optical switching element to be a switching element influencing polarization.

In this case, the switching element influencing polarization preferably carries out a change in the polarization which then causes a complete or partial, actively controlled coupling of laser radiation out of the radiation field system in combination with a reflector dependent on polarization.

Another advantageous solution provides for the actively switchable optical switching element to be a switching element diffracting radiation, i.e., the laser radiation is coupled out of the radiation field system by way of diffraction.

For example, the actively switchable optical switching element is designed in this respect as an acousto-optical modulator which acts in a manner diffracting radiation by means of a sound wave field.

The solid-state member designed like a thin plate can, furthermore, be advantageously defined by the fact that this has a thickness which corresponds at the most to a tenth, even better one hundredth of its smallest extension in the direction of a flat side.

With respect to the arrangement of the solid-state member itself, no further details have been given in conjunction with the preceding explanations concerning the inventive solution. One particularly favorable solution, for example, provides for the solid-state member to be cooled via a flat side by means of a heat sink in order to prevent thermal tensions and a thermal formation of lenses in it.

For example, the heat sink is a cooling medium or a cooling member. In this respect, the solid-state member is preferably arranged on a cooling member and supported by it.

The laser-active medium in the solid-state member is preferably a laser-active material with a low amplification, as described, for example, in European patent No. 0 632 551.

Furthermore, the solid-state member preferably has a laser-active material with a high saturation intensity, as described, for example, in European patent No. 0 632 551.

Additional features and advantages of the inventive solution are the subject matter of the following description as well as the drawings illustrating several embodiments.

In the drawings:

FIG. 3 shows a schematic illustration similar to FIG. 1 of a second embodiment of an inventive laser amplifying system;

FIG. 4 shows a schematic illustration similar to FIG. 1 of a third embodiment of an inventive laser amplifying system;

FIG. 5 shows a schematic illustration similar to FIG. 1 of a fourth embodiment of an inventive laser amplifying system;

FIG. 6 shows an illustration of the fourth embodiment according to FIG. 5 with a reduced number of intermediate branches;

FIG. 9 shows a schematic illustration similar to FIG. 1 of a seventh embodiment;

FIG. 10 shows a schematic illustration similar to FIG. 9 of an eighth embodiment;

FIG. 14 shows a schematic illustration of a first possible mode of operation of the inventive laser amplifying system in pulsed operation;

Figure 1:
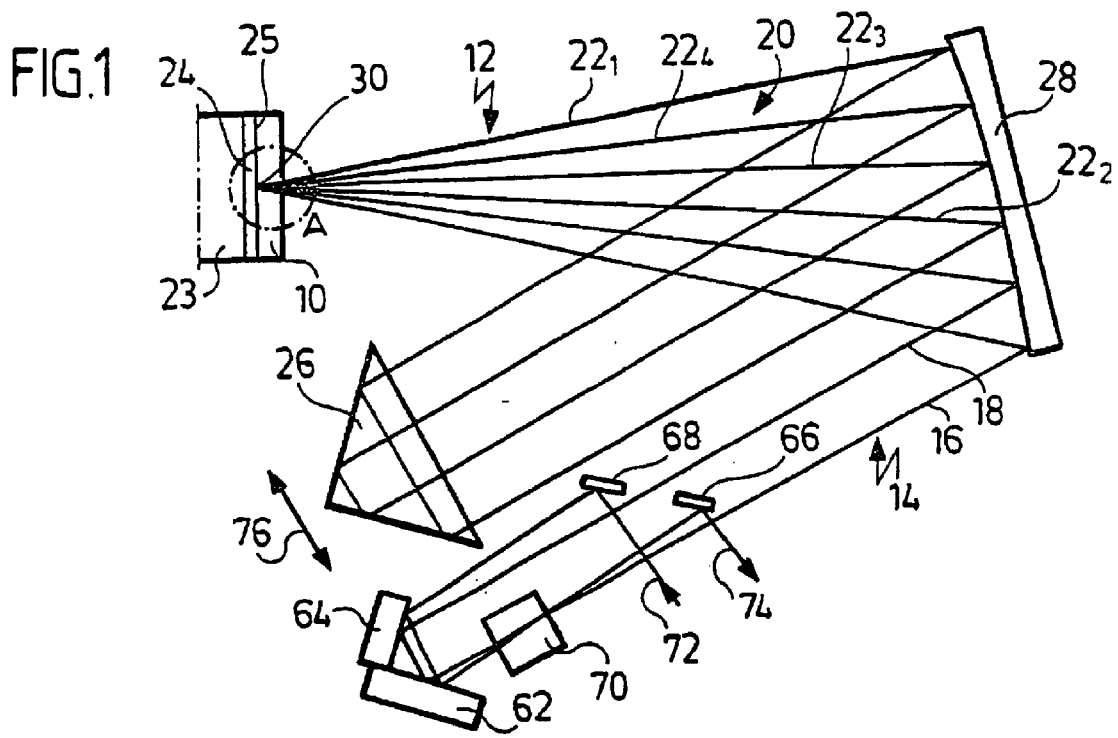
FIG. 1 shows a schematic illustration of a first embodiment of an inventive laser amplifying system.

A first embodiment of an inventive laser amplifying system, illustrated in FIG. 1, comprises a solid-state member 10 which is designed like a thin plate and has a laser-active medium which is pumped optically or directly electrically by means of a pumping light source not illustrated in the drawings and, therefore, has an inversion of distribution for a laser amplification in the pumped volume area.

An optical guide means for the radiation field, designated as a whole as 12, defines a radiation field system which is designated altogether as 14 and comprises an incoming branch 16, an outgoing branch 18 and an amplifying radiation field 20 provided between the incoming branch 16 and the outgoing branch 18, wherein the amplifying radiation field 20 is formed by a plurality of intermediate branches $22_1$ to $22_4$ which are illustrated by way of example, follow one another subsequent to the incoming branch 16 and which are adjoined by the outgoing branch 18.

In order to form the intermediate branches $22_1$ to $22_4$, the optical guide means 12 for the radiation field comprises a first beam reversing element 24, preferably designed as a reflector which reflects back by means of a reflection surface 25 and converts an intermediate branch impinging on it, for example, the intermediate branch $22_2$ into the next following intermediate branch, for example, the intermediate branch $22_3$, wherein consecutive intermediate branches 22 form an angle of>0° with one another, and a second beam reversing element 26 which is designed, for example, as a deflector and deflects each incoming intermediate branch 22, for example, the intermediate branch 22, into a spatially separate intermediate branch 22 propagating in a reverse direction.

The deflector 26 is designed, for example, such that it converts each intermediate branch 22, for example, the intermediate branch $22_1$ into an intermediate branch offset parallel thereto, for example, the intermediate branch $22_2$. Preferably, a transfer element 28 is also provided which causes, at the same time, a folding of the intermediate branches $22_1$ to $22_4$ and, in this respect, also converts the intermediate branches $22_1$ to $22_4$ extending parallel to one another in the direction of the deflector 26 into intermediate branches impinging on a surface area 30 on the reflector 24.

Figure 2:
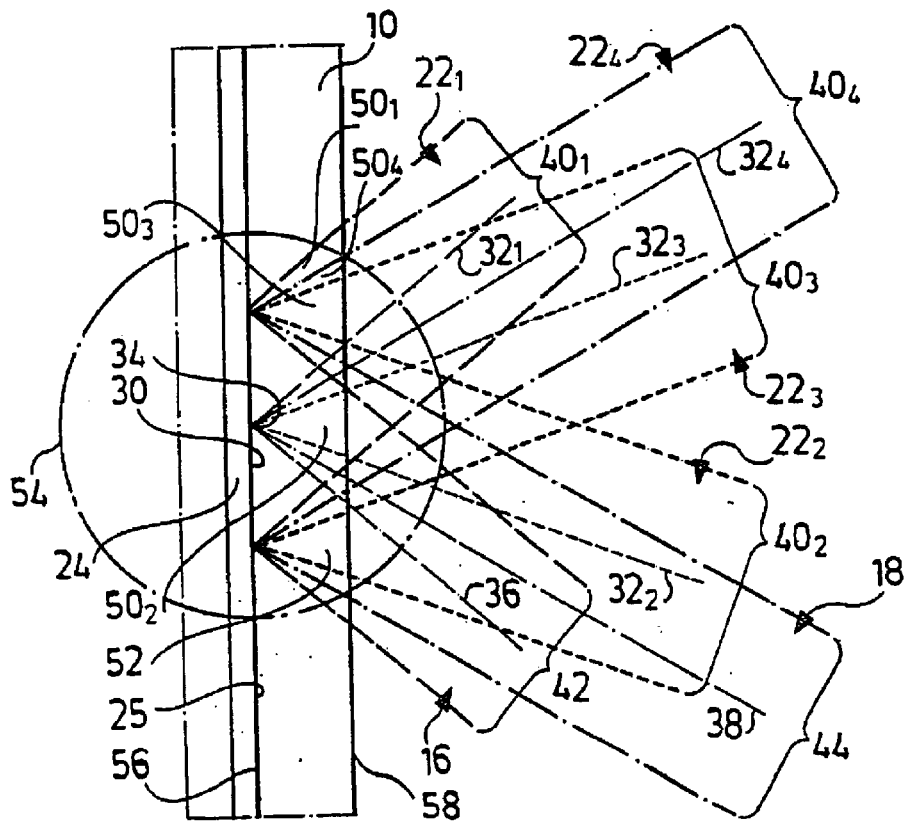
FIG. 2 shows a detailed schematic illustration of the area A in FIG. 1.

In this respect, the intermediate branches $22_1$ to $22_4$ extend with their beam axes $32_1$ to $32_4$ such that they intersect at an essentially punctiform volume of intersection 34 centrally of the surface area 30 and, in addition, intersect in the punctiform volume of intersection 34 with a beam axis 36 of the incoming branch 16 and a beam axis 38 of the outgoing branch 18, as well (FIG. 2).

The punctiform volume of intersection 34 preferably has a maximum extension in each direction which is smaller than one tenth of the maximum extension of the surface area 30, even better smaller than one hundredth of the surface area 30.

The extension of the surface area 30 in each direction is preferably determined by a radiation field cross section $40_1$ to $40_4$ of the respective intermediate branch $22_1$ to $22_4$ as well as a radiation field cross section 42 of the incoming branch 16 and a radiation field cross section 44 of the outgoing branch 18, wherein the optical guide means 12 for the radiation field is preferably designed such that the radiation field cross sections 40, 42 and 44 are approximately of the same size.

Since the beam axes 32 of the intermediate branches 22 form with the reflection surface 25 of the reflector 24 an angle of less than 90°, the surface area 30 is greater than the respective radiation field cross sections 40 of the intermediate branches 22.

Each of the intermediate branches $22_1$ to $22_4$ penetrates the solid-state member 10 with a volume section $50_1$ to $50_4$, wherein the volume sections $50_1$ to $50_4$ preferably overlap and the sum of all the volume sections $50_1$ to $50_4$ determines an active volume area 52 in the solid-state member 10, within which a laser amplification is brought about on account of the inversion.

In order to have the volume sections $50_1$ to $50_4$ essentially overlapping in the solid-state member 10, the punctiform volume of intersection 34, in which the beam axes 32, 36 and 38 intersect, is placed such that it is located within a spatial area 54 which incorporates the active volume area 52 and extends beyond flat sides 56 and 58 of the solid-state member at the most over a distance corresponding to the distance between the flat sides 56 and 58.

Furthermore, the optical guide means 12 for the radiation field comprises an end element 62 for the incoming branch 16 and an end element 64 for the outgoing branch 18, wherein auxiliary mirrors 66 and 68 are, for example, associated with the end elements 62 and 64 in order to couple laser radiation into and out of the laser amplifying system in a suitable manner.

Furthermore, as illustrated in FIG. 1, a switching element 70 is associated with the incoming branch 16 and this can be switched back and forth, for example, between a state diffracting radiation or a state not influencing radiation.

Such an element which diffracts radiation is, for example, an acousto-optical modulator such as that described in the PCT application EP00/01802, to which reference is made in full.

With such an acousto-optical modulator as switching element 70, it is possible to couple a laser pulse, which enters in the form of an incoming radiation field 72 at an acute angle to the incoming branch 16 due to the end elements 64 and 62, into the incoming branch 16 due to diffraction by means of the acousto-optical modulator 70 so that it then impinges on the reflector 24 via the incoming branch 16, folded by the transfer element 28, and is converted by the reflector, as illustrated in FIG. 2, into the first intermediate branch $22_1$ due to reflection in the surface area 30.

The intermediate branch $22_1$ propagates, proceeding from the reflector 24, via the transfer element 28 to the deflector 26 and is there converted into an intermediate branch $22_2$ which is offset in parallel, is again reflected by the transfer element 28 to the surface area 30 and in this area is converted by the reflector 24 by way of reflection into the intermediate branch $22_3$ which, again, extends via the transfer element 28 to the deflector 26, is converted by this into the intermediate branch $22_4$ which, for its part, extends again via the transfer element 28 to the surface area 30 and is converted therein by the reflector 24 by way of reflection into the outgoing branch 18.

The end elements 62 and 64 are arranged relative to one another such that they convert the outgoing branch 18 into the incoming branch 16 on their side facing away from the amplifying radiation field so that after the laser pulse has passed through the radiation field system 14 once the laser pulse passes through the radiation field 14 again, namely for such a time until the switching element 70 is activated which allows the laser pulse entering the incoming branch 16 via the outgoing branch 18 to exit as exiting radiation field 74 due to diffraction at an acute angle in relation to the incoming branch 16 and reflection at the auxiliary mirror 66.

As a result, it is possible to amplify a laser pulse entering via the incoming radiation field 72 in the inventive radiation field system 14 for such a time until an adequately large energy is available and then to couple it out of the radiation field system 14 via the switching element 70.

In addition, the first embodiment of the inventive laser pulse amplifying system forms the possibility of variably adjusting the number of intermediate branches 22.

If, for example, the deflector 26 is displaced in a direction 76 transversely to the beam axes of the branches impinging on it such that it converts the first intermediate branch $22_1$ into the fourth intermediate branch $22_4$ and, therefore, the intermediate branches $22_2$ and $22_3$ are omitted, the time a laser pulse requires in order to pass from the incoming branch 16 to the outgoing branch 18 in the radiation field system 14 is shorter and, in addition, the amplification is less since the amplification which takes place in the second and third intermediate branches $22_2$ and $22_3$ is omitted.

The solid-state member 10 is preferably cooled by a heat sink 23 which is arranged on a side located opposite the reflector 24 so that the heat from the solid-state member 10 is conveyed areally through the reflector 24 via the heat sink 23.

In a second embodiment of an inventive laser amplifying system, illustrated in FIG. 3, those elements which are identical to those of the first embodiment are given the same reference numerals and so reference can be made in full to the first embodiment with respect to their description.

The end elements 62 and 64 of the incoming branch 16 and the outgoing branch 18 are arranged in the same way as in the first embodiment but the end element 62 is a mirror reflecting as a function of polarization. For this reason, the switching element 70' is arranged in the outgoing branch 18 so that it is possible either to convert the outgoing branch 18 into the incoming branch 16 at the end element 62 by way of a suitable influencing of polarization and, therefore, to pass through the entire radiation field system 14 again or to influence the polarization such that the outgoing branch 18 passes through the mirror 62, which is transparent as a function of polarization, after reflection at the end element 64 on account of the suitable direction of polarization and, therefore, exits as an outgoing radiation field 74.

In the same way, the incoming radiation field 72 can be coupled in through the end element 62 by way of suitable polarization.

In a third embodiment of an inventive laser amplifying system, those elements which are identical to those of the embodiments described in the above are likewise given the same reference numerals and so reference can be made in full to the comments concerning the first and second embodiments with respect to their description.

In contrast to the first and second embodiments, the end elements 62 and 64 are designed as mirror elements which reflect back and so a laser pulse passing through the radiation field system 14 is reflected back into itself at the end element 64 without any action by the switching element 70' or is coupled out due to influencing of polarization by means of the switching element 70' and an auxiliary mirror 68' which is partially transparent and reflects as a function of polarization.

In the same way, it is conceivable to arrange the switching element 70' and the partially transparent auxiliary mirror 68' dependent on polarization in the incoming branch 16 so that the laser pulse is always reflected back into itself at the end element 68 when it reaches the outgoing branch 18 and passes through the entire radiation field system 14 again in the reverse direction as far as the incoming branch and can only be coupled out by the switching element in the incoming branch 14.

In a fourth embodiment, illustrated in FIG. 5, the optical guide means 12' for the radiation field is modified insofar as the incoming branch 16 and the outgoing branch 18 coincide geometrically and, in addition, the amplifying radiation field 20 has two respective, geometrically coinciding intermediate branches.

As illustrated in detail in FIG. 5, the incoming branch 16 is converted into the first intermediate branch $22_1$ in the surface area 30 by way of reflection at the reflector 24, this first intermediate branch extending via the transfer element to the deflector 26 and being converted by the deflector 26 into the second intermediate branch $22_2$ which is, again, converted in the surface area 30 by the reflector 24 into the third intermediate branch $22_3$ which is converted into the fourth intermediate branch $22_4$ by the transfer element 28 and the deflector 26.

The fourth intermediate branch $22_4$ impinges on the surface area 30 of the reflector 24 such that it is converted into a fifth intermediate branch $22_5$ which extends geometrically congruent to the fourth intermediate branch $22_4$ but in a reverse direction and which again extends via the transfer element 28 and to the deflector 26 and is converted by this into the sixth intermediate branch $22_6$ which extends geometrically congruent to the third intermediate branch $22_3$ but in a reverse direction of propagation and, therefore, is converted at the surface area 30 of the reflector 24 into the seventh intermediate branch $22_7$ which, for its part, again extends congruent to the second intermediate branch $22_2$ but, again, in a reverse direction of propagation and impinges via the transfer element 28 on the deflector 26 such that this converts the seventh intermediate branch $22_7$ into an eighth intermediate branch $22_8$ which extends geometrically congruent to the first intermediate branch $22_1$ but in a reverse direction of propagation and is again converted at the surface area 30 of the reflector 24 into an outgoing branch 18 which extends congruent but in a reverse direction to the incoming branch 16 and then impinges on a single end element 63.

In addition, the switching element 70" is provided which is provided for the purpose of generating optical losses in the radiation field system 14, by means of which the laser threshold can be reached in an actively controlled manner. Furthermore, the end element 63 is partially transparent and sees to it that part of the laser radiation, for example, of one laser pulse is coupled out by way of reflection at the end element 63 and the other part is reflected.

It is also possible in the fourth embodiment, as illustrated in FIG. 6, to adjust the number of intermediate branches 22 variably by displacing the deflector 26 in a direction 76.

If, for example, the deflector 26 is displaced such that the first intermediate branch $22_1$ is converted directly into the fourth intermediate branch $22_4$, the intermediate branch $22_5$ is converted immediately after its formation, again by means of the deflector 26, into the intermediate branch $22_8$, from which the outgoing branch 18 then results so that the intermediate branches $22_2$ and $22_3$ as well as $22_6$ and $22_7$ are omitted.

Figure 7:
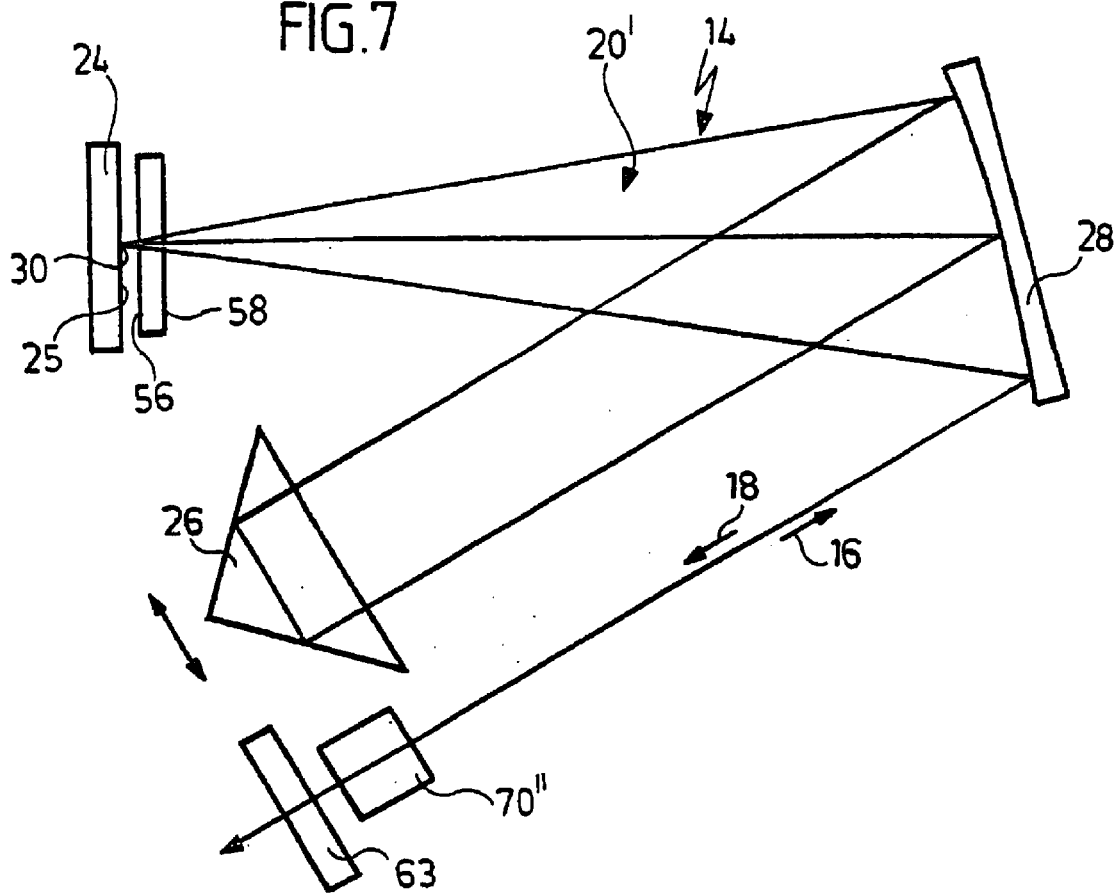
FIG. 7 shows a schematic illustration similar to FIG. 5 of a fifth embodiment.

In a fifth embodiment of an inventive laser amplifying system, illustrated in FIG. 7, the solid-state member 10 is, in contrast to the embodiments described above, not seated directly with its flat side 56 on the reflection surface 25 of the reflector 24 but rather the flat side 56 is arranged at a distance from the reflection surface 25 but still such that the volume of intersection 34 is located within the spatial area 54, as explained in conjunction with the first embodiment.

Figure 8:
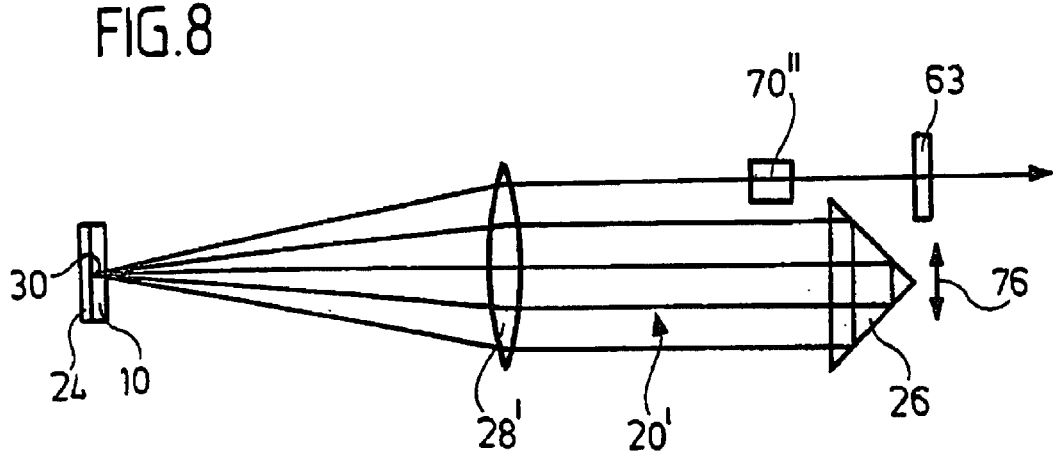
FIG. 8 shows a schematic illustration similar to FIG. 1 of a sixth embodiment.

In a sixth embodiment, illustrated in FIG. 8, the same principle is used as in the fourth and fifth embodiments but, in contrast to all the preceding embodiments, the transfer element 28' is not designed as a reflector but rather as a lens system so that the deflector 26 and the reflector 24 are arranged so as to be located opposite one another.

As for the rest, the sixth embodiment operates in the same way as the fourth embodiment and so, with respect to the functioning thereof, reference can be made in full to the comments on the fourth embodiment.

A seventh embodiment, illustrated in FIG. 9, operates, fundamentally, according to the same principle as the fourth to sixth embodiments, i.e., the amplifying radiation field 20 has intermediate branches 22 which coincide geometrically but propagate in different directions.

In contrast to all the preceding embodiments, the deflector 26 is, however, designed as a reflecting mirror and has a surface area 80, in which the intermediate branches impinge and are reflected analogously to the conditions in the surface area 30, wherein all the beam axes 32 preferably intersect in a punctiform volume of intersection 84 analogous to the punctiform volume of intersection 34.

In adaptation to this modified deflector 26, the transfer element 28" is also designed such that the intermediate branches $22_1$ to $22_8$ each extend between the surface areas 30 and 80 and extend so as to overlap with their radiation field cross sections 40 in these surface areas 30 and 80.

Furthermore, in the case of the seventh embodiment the number of intermediate branches 22 can be selected by turning the deflector 26 according to the direction arrow 81, wherein an axis of rotation 82 intersects the volume of intersection 84.

In an eighth embodiment, illustrated in FIG. 10, the same principle is used as in the seventh embodiment but with the difference that the transfer element 28" is formed from two reflectors, namely $28''_1$ and $28''_2$, which each provide for an overlapping of the radiation field cross sections 40 of the individual intermediate branches $22_1$ to $22_8$ in the surface areas 30 and 80 whereas the intermediate branches 22 extend parallel to one another between the reflectors $28''_1$ and $28''_2$, wherein it is possible to use a spatial filter, as described, for example, in U.S. Pat. No. 4,156,852.

Figure 11:
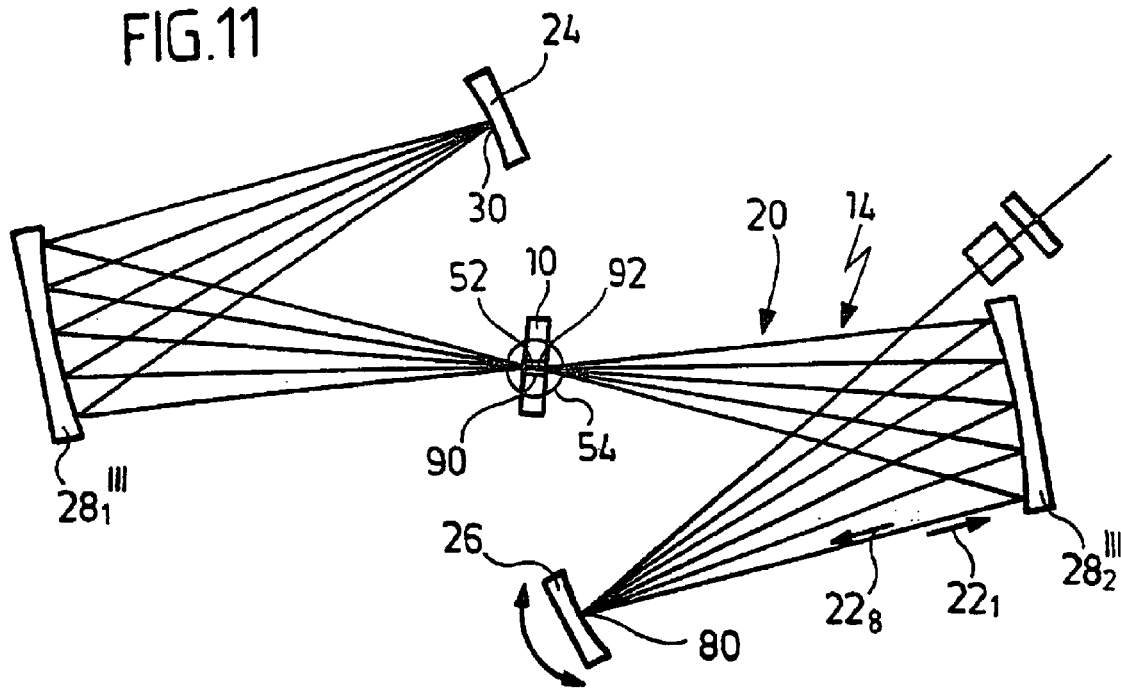
FIG. 11 shows a schematic illustration similar to FIG. 10 of a ninth embodiment.

In a ninth embodiment, illustrated in FIG. 11, the amplifying radiation field 20 is shaped in such a manner that the intermediate branches $22_1$ to $22_8$ overlap with their radiation field cross sections 40 not only in the surface areas 30 and 80 of the reflector 24 and the deflector 26, respectively, but also in an intermediate focal point 90 which is formed between the transfer elements $28'''_1$ and $28'''_2$.

Moreover, the solid-state member 10 is not seated in front of the reflector 24 but is arranged such that it is irradiated by the sections of the intermediate branches 22 extending between the transfer elements $28'''_1$ and $28'''_2$.

The radiation field axes 32 of all the intermediate branches 22 preferably intersect at the intermediate focal point 90 within a volume of intersection 92 which is located within the spatial area 54 comprising the active volume area 52 in order to obtain, as explained in conjunction with the punctiform area 34 in the case of the preceding embodiments, as extensive an overlapping as possible of the volume sections $50_1$ and $50_8$ of the intermediate branches $22_1$ to $22_8$ within the active volume area 52 of the solid-state member 10.

Figure 12:
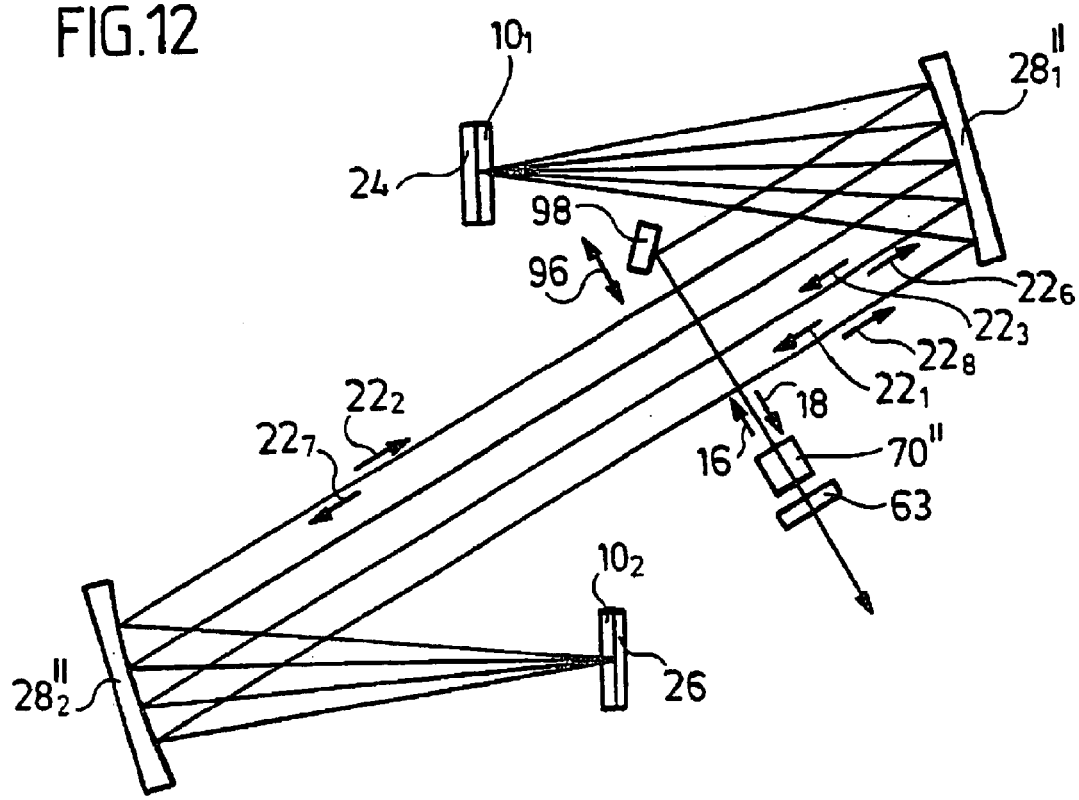
FIG. 12 shows a schematic illustration similar to FIG. 10 of a tenth embodiment.

In a tenth embodiment, illustrated in FIG. 12, those elements which are identical to those of the preceding embodiments are given the same reference numerals, wherein the tenth embodiment is based on the principle of the eighth embodiment, illustrated in FIG. 10.

In contrast to the eighth embodiment, a solid-state member $10_2$ consisting of a laser-active material, which has an inversion on account of pumping, is also provided in front of the deflector 26, which is designed as a reflector, in the tenth embodiment so that each of the intermediate branches $22_1$ to $22_8$ passes through an active volume area 52 in the corresponding solid-state member $10_1$ and $10_2$ twice and, therefore, experiences a double amplification.

Furthermore, a deflecting mirror 98, with which it is possible to place the incoming branch 16 and the outgoing branch such that they are converted either into the first intermediate branch $22_1$ or $22_8$, respectively, or the third intermediate branch $22_3$ or $22_6$, respectively, is provided for adjusting the number of intermediate branches 22, this deflecting mirror being displaceable in a direction 96 transverse to the sections of the intermediate branches 22 extending between the transfer elements $28''_1$ and $28''_2$.

As for the rest, the tenth embodiment is designed in the same way as the preceding embodiments and so with respect to the remaining elements which are not described reference is made in full to the preceding embodiments.

Figure 13:
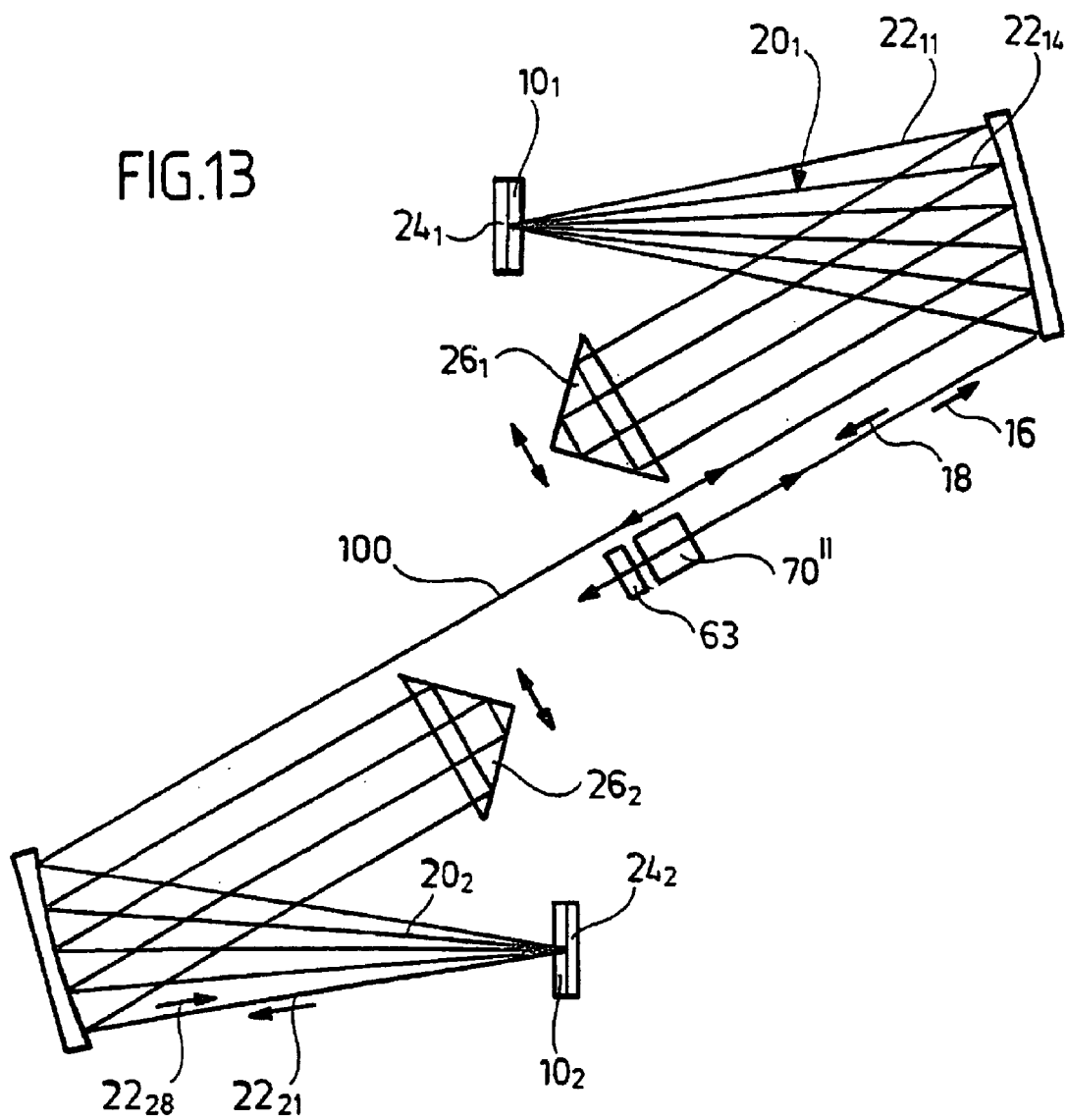
FIG. 13 shows a schematic illustration similar to FIG. 5 of an eleventh embodiment.

In an eleventh embodiment, illustrated in FIG. 13, the radiation field system 14 comprises two amplifying radiation fields $20_1$ and $20_2$ which are coupled to one another by a connecting branch 100.

A laser pulse entering the amplifying radiation field $20_1$ via the incoming branch 16 is, therefore, amplified first of all in the amplifying radiation field $20_1$ by means of the intermediate branches $22_{11}$ to $22_{14}$ extending between the reflector $24_1$ and the deflector $26_1$, the intermediate branch $22'_4$ is then coupled to the intermediate branch $22_{21}$ of the amplifying radiation field $20_2$ via the connecting branch 100 and amplified in the solid-state member $10_2$ by the intermediate branches $22_{21}$ to $22_{28}$ which extend between the reflector $24_2$ and the deflector $26_2$ for such a time until the intermediate branch $22_{28}$ is again converted into the connecting branch 100 which, on the other hand, leads to the laser pulse passing through the amplifying radiation field $20_1$ in a reverse direction.

The amplifying radiation field 202 is designed in the same way as the amplifying radiation field 20' of the fourth embodiment, illustrated in FIG. 5.

Altogether, the laser radiation, for example, in the form of a laser pulse which is coupled in via the incoming branch 16 thus passes first of all through the intermediate branches $22_{12}$ to $22_{14}$ of the amplifying radiation field $20_1$, then through the intermediate branches $22_{21}$ to $22_{28}$ of the second amplifying radiation field $20_2$, then through the intermediate branches $22_{14}$ to $22_{11}$ of the first amplifying radiation field $20_1$ again and then reaches the outgoing branch 18.

In an additional, preferred embodiment of an inventive laser amplifying system, the radiation field system 14 is built up such that the phase curvature of the intermediate branches 22 is essentially identical with the same direction of beam propagation in the volume sections 50 of the intermediate branches 22 penetrating the active volume area 52. As a result, it is possible for the phase curvature and the beam diameter in the incoming and outgoing branches to be, to a great extent, independent of the number of intermediate branches 22.

Furthermore, in this embodiment the radiation field system 14 is, in addition, designed such that the radiation field cross sections 40 of the intermediate branches 22 have within the active volume area 52 the same symmetry and also the same alignment of symmetry with the same respective direction of propagation so that the intermediate branches 22 penetrating the active volume area 52 with approximately the same direction of propagation are coupled to the laser-active material in the solid-state member 10 in the same way.

These relations may be achieved, for example, in the case of the embodiment according to FIG. 10.

In addition, in an additional, advantageous embodiment the radiation field system 14 is designed such that the radiation conditions of an afocal system, with which beam parts of the same angle in the active volume always have the same angle relative to one another, are present in the active volume area 52 due to each intermediate branch 22 penetrating it in the same beam direction.

Such a condition may be achieved, for example, in the case of the embodiment according to FIG. 10.

The inventive laser amplifying system may be preferably operated in the following operating modes.

It is, in principle, conceivable to operate the inventive laser amplifying system in continuous operation, wherein the switching element 70, for example, working as an acousto-optical modulator according to the embodiment of FIG. 1 provides for a constant coupling out of the laser power.

However, the inventive laser amplifying system may be operated particularly advantageously in pulsed operation, wherein in pulsed operation the great advantage is to be seen in the fact that a laser pulse has a long propagation time on its way through the radiation field system 14 from the incoming branch 16 to the outgoing branch 18, caused by the large number of possible intermediate branches 22 of the amplifying radiation field 20, wherein at least each intermediate branch 22 penetrates the laser-active medium 10 once within the amplifying radiation field 20 and, therefore, the laser pulse experiences at least once an amplification in the laser-active medium 10 when passing through each intermediate branch 22.

As a result, the number of passes through the laser-active medium can be kept very high, in particular, in the case of laser-active media in the form of thin solid-state plates 10 and so a considerable amplification can be achieved without this being impaired by the losses due to the switching element 70 since the losses in the switching element 70 only occur when the laser pulse reaches either the incoming branch 16 or the outgoing branch 18, in which the switching element 70 is preferably arranged.

A pulsed operation either with the switching element 70 or the switching element 70' or the switching element 70" with optical components associated accordingly is possible in the case of all the embodiments described above.

A first mode of operation of the pulsed laser system is illustrated in FIG. 14.

With this mode of operation, the so-called quality switching or also Q switch, the switching element 70" influencing losses in the radiation field system 14 is—as illustrated in FIG. 14a—switched first of all such that the losses in the radiation field system 14 are so high that the laser threshold is not reached. In this state, energy is stored in the laser-active medium which is constantly pumped optically.

If the switching element 70 is now switched at the point of time $t_{in}$ to losses which are as low as possible, a laser pulse P is built up in the radiation field system 14 either due to spontaneous emission or due to a pulse coupled in, wherein with this build up of the laser pulse P so much energy is removed from the laser-active medium, i.e., the solid-state member 10 that the laser threshold is not reached on account of the drop in the inversion density during the build up of the laser pulse P and, therefore, no more laser amplification results for a certain time (FIG. 14b).

The laser pulse P is now partially coupled out by means of a partially transparent mirror, as illustrated, for example, by the end element 63 (FIG. 14c).

In order to have the possibility again of building up a high inversion density, the losses are again held at a high value following build up of the laser pulse P and exiting thereof due to the switching element 70" at the point of time $t_{out}$ for such a time until a high inversion density in the laser-active medium 10 has been built up.

Since, in the case of quality switching, the pulse build-up time and the pulse duration increase with the propagating time of the laser pulse P from the incoming branch 16 to the outgoing branch 18, the periods of time from $t_{in}$ to $t_{out}$ become great and so slow-operating switching elements, for example, switching elements 70" operating in the microsecond range can advantageously be used as switching element 70".

In the case of the switching elements 70 and 70', the number of passes and, therefore, also the pulse duration can be selected by means of the active coupling out.

With respect to the fundamental performance of the pulsed operation with quality switching, reference is made to the book "Lasers", Anthony E. Siegman, University Science Books, 1986, ISBN 0-935702-11-5 or the book "Solid-State Laser Engineering", Walter Koechner, Springer Publishing House, 1999, ISBN 3-540-65064-4.

Figure 15A:
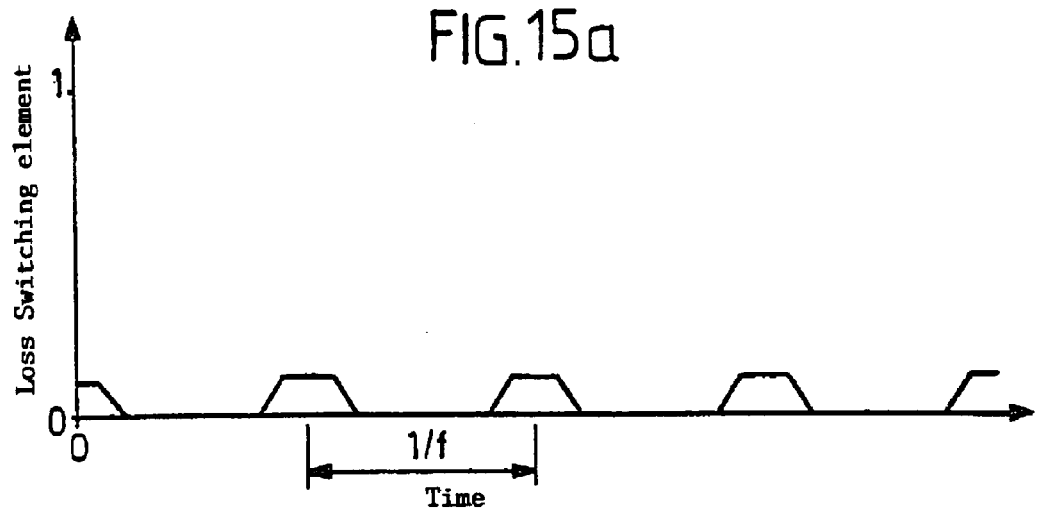
FIG. 15 shows a schematic illustration of a second possible mode of operation of the inventive laser amplifying system in pulsed operation.
Figure 15B:
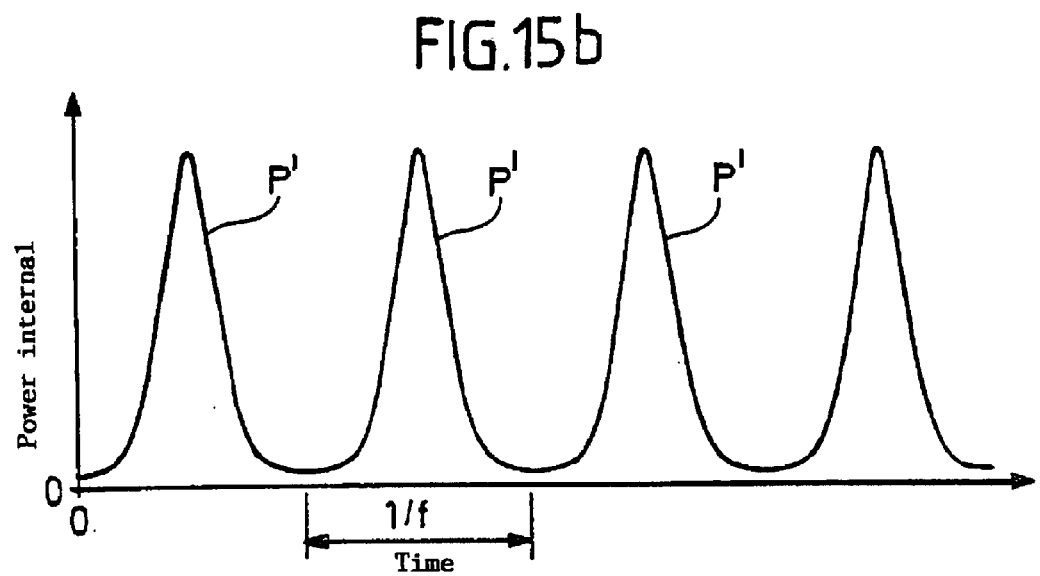
Figure 15C:
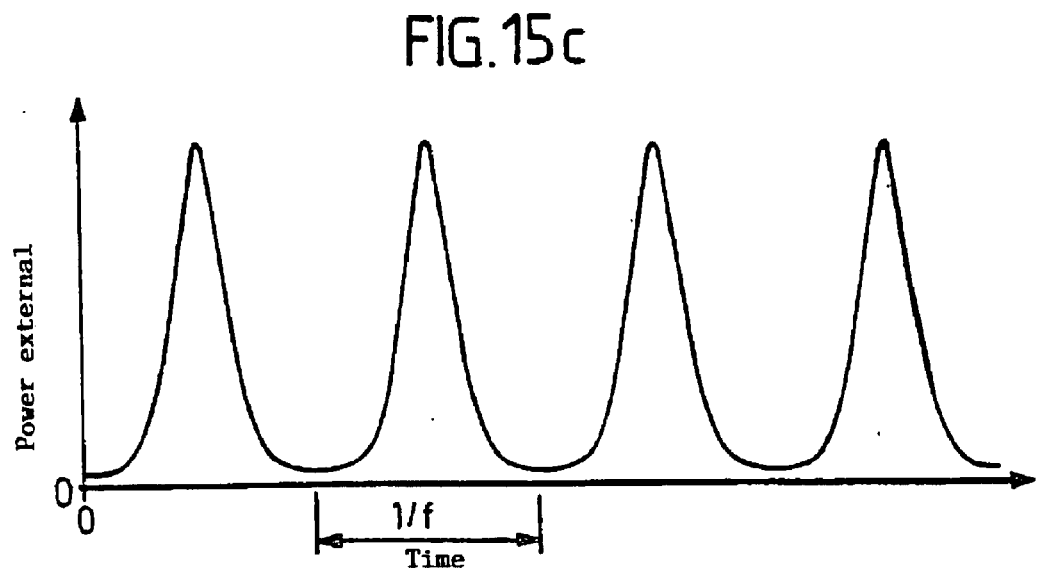

In the case of a second mode of operation, illustrated in FIG. 15, a pulsed operation is generated by way of amplified relaxation oscillations. Amplified relaxation oscillations of this type may be achieved by way of small periodic interferences of the laser amplifying system, triggered by the switching element 70", when the frequency of the interference corresponds approximately to the resonance frequency of the relaxation oscillation. A precondition for the pulsed operation by way of amplified relaxation oscillations is that this does not fall below the laser threshold and, therefore, the laser need not restart each time from the noise.

For this reason, as illustrated in FIG. 15a, the losses in the radiation field system 14 are modulated only by a slight modulation depth so that, as illustrated in FIG. 15b, periodic laser pulses P are formed in the radiation field system 14.

The time interval between the individual laser pulses P' is dependent on the propagation time which can be selected to be very long in the inventive laser amplifying system in order to achieve time intervals between the laser pulses P' which are as large as possible and, on the other hand, to be able to operate with switching elements 70" with a low frequency.

The coupling out is brought about in this case by way of the partially transparent end element 63.

With respect to the general description of the mode of operation with amplified relaxation oscillations, reference to made to the book of "Siegmann" already cited above.

Figure 16A:
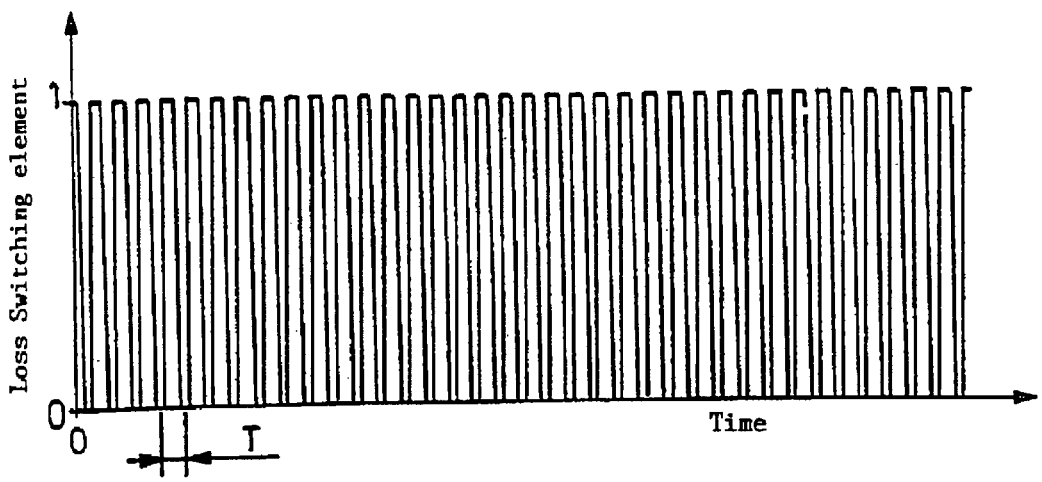
FIG. 16 shows a schematic illustration of a third possible mode of operation of the inventive laser amplifying system in pulsed operation.
Figure 16B:
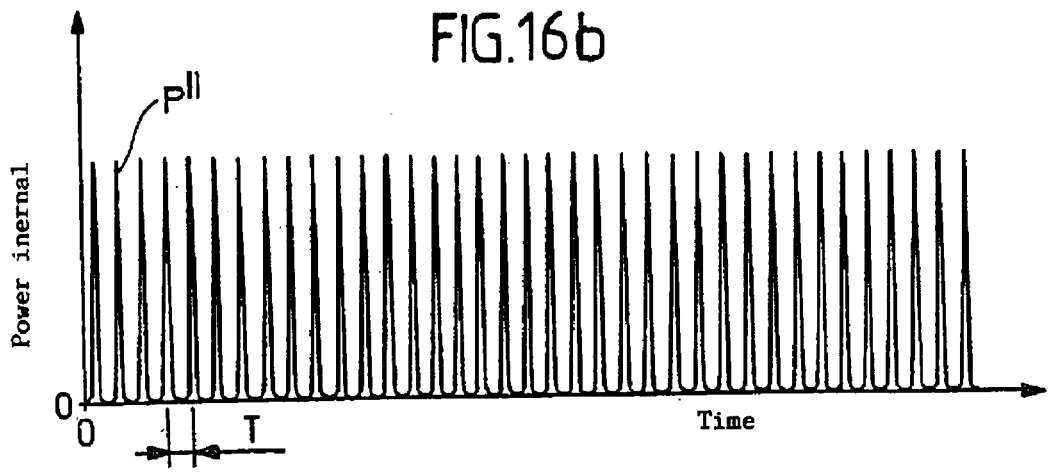
Figure 16C:
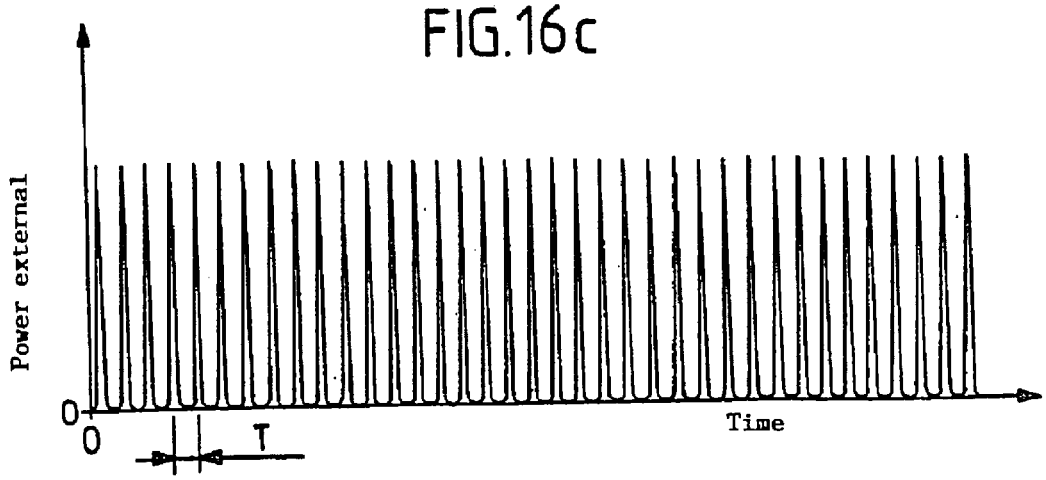

In a third mode of operation of the so-called active mode coupling, illustrated in FIG. 16, the losses in the radiation field system are modulated by the switching element 70 or 70' or 70" with the propagation time of a laser pulse P''' from the incoming branch 16 to the outgoing branch 18 (FIG. 16*a*), wherein the propagation time is designated as T. The modulation of the losses with 1/T leads to a single laser pulse P''' being formed in the radiation field system 14 (FIG. 16*a*) which propagates in this and passes through the switching element 70 exactly when this has minimum losses.

The inventive laser amplifying systems offer, on account of the adjustability of the propagation times, a possibility of adjusting the switching frequency and, on the other hand, it is fundamentally possible on account of the long propagation times to use slow-operating switching elements 70.

Figure 17A:
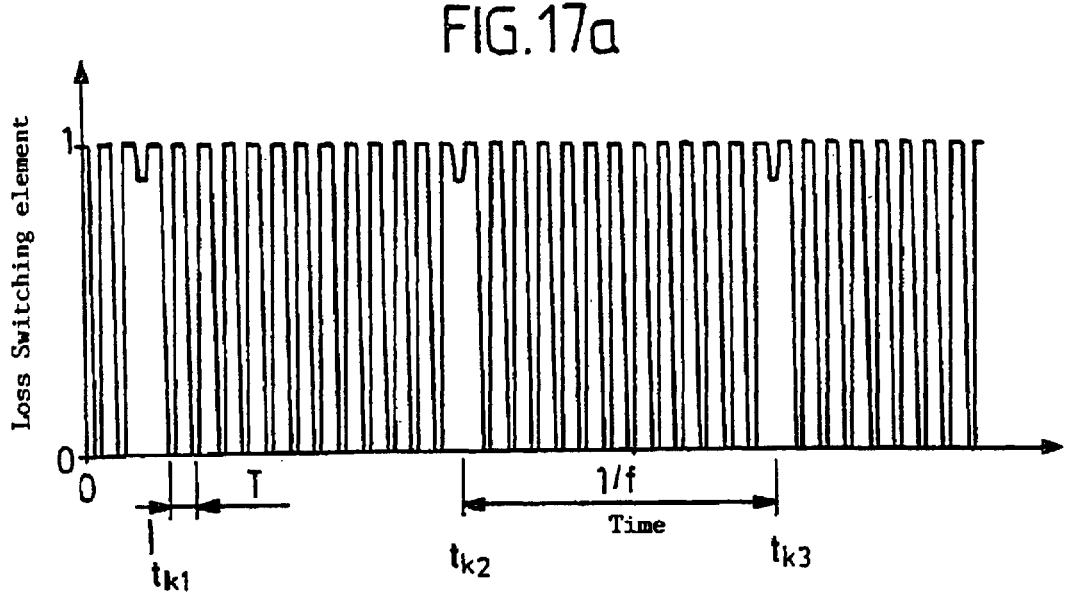
FIG. 17 shows a schematic illustration of a fourth possible mode of operation of the inventive laser amplifying system in pulsed operation.

In the case of a fourth mode of operation, illustrated in FIG. 17, the mode of operation of mode coupling is combined with the mode of operation of "cavity dumping".

Figure 17B:
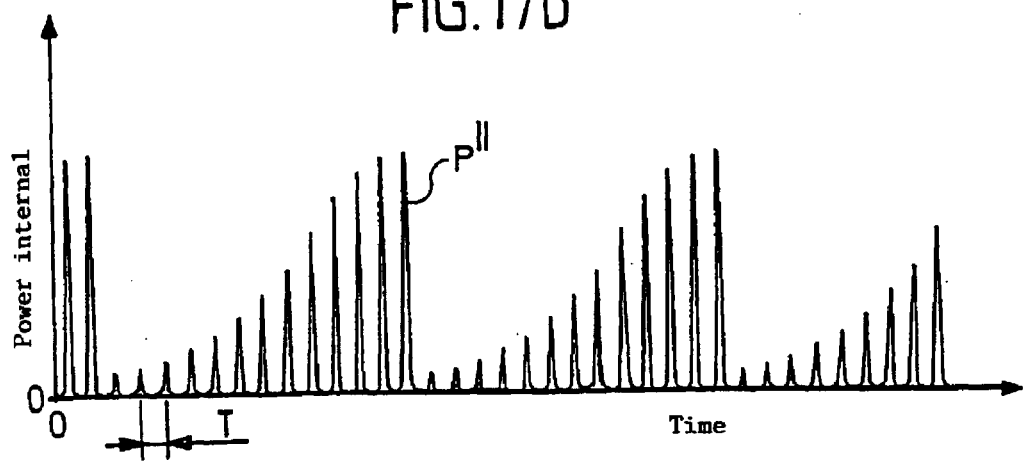
Figure 17C:
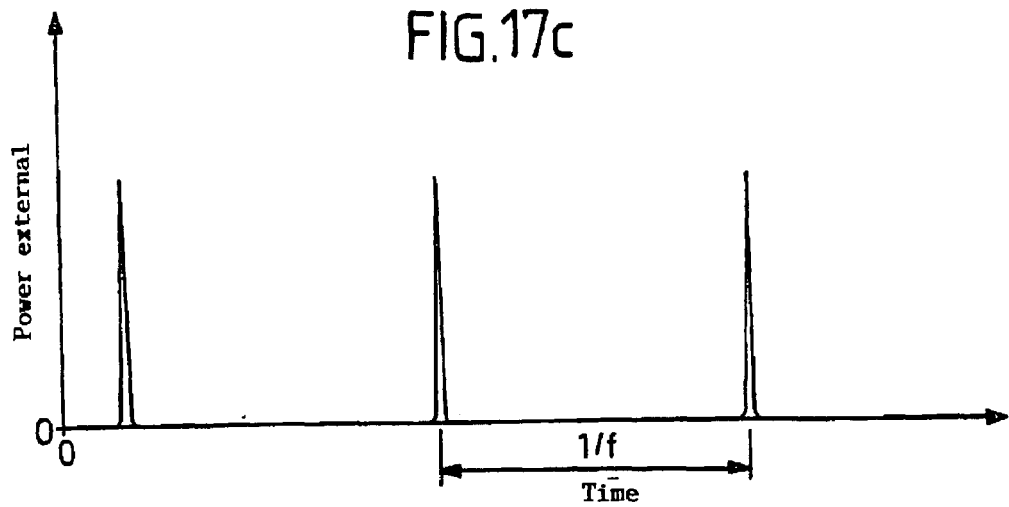

In principle, the losses in the radiation field system 14 are modulated in this respect (FIG. 17*a*) so that, as illustrated in FIG. 17*b*, a single pulse P''' propagates.

A single propagating pulse P''' of this type is not coupled out each time upon reaching the outgoing branch 18 or the incoming branch 16, as would be the case with the third mode of operation, but rather the one laser pulse P''' which is formed propagates several times in the radiation field system 14, wherein the pulse energy is constantly increased. When the maximum pulse energy is reached, the switching element 70 is switched at the point of time $t_k$ such that it couples out the arriving laser pulse P''' to the greatest extent (FIG. 17*c*) by way of beam diffraction, as in the first embodiment, or by way of rotation of polarization, as in the second embodiment, so that only a remaining laser pulse which is considerably reduced in its energy propagates again in the radiation field system 14 and the energy contained in it is continuously built up again for such a time until a coupling out again takes place at a point of time $t_k$.

In accordance with the invention, it is now possible to modulate the losses, on the one hand, such that a mode coupling results and, on the other hand, to couple the laser pulse P''' which has built up out of the radiation field system 14 at a specific point of time $t_k$ with a single switching element 70, for example, the acousto-optical modulator 70 described in conjunction with the first embodiment of the inventive laser amplifying system.

In a fifth mode of operation of the inventive laser amplifying system, illustrated in FIG. 18, a combination of mode coupling, cavity dumping and quality switching takes place.

Figure 18A:
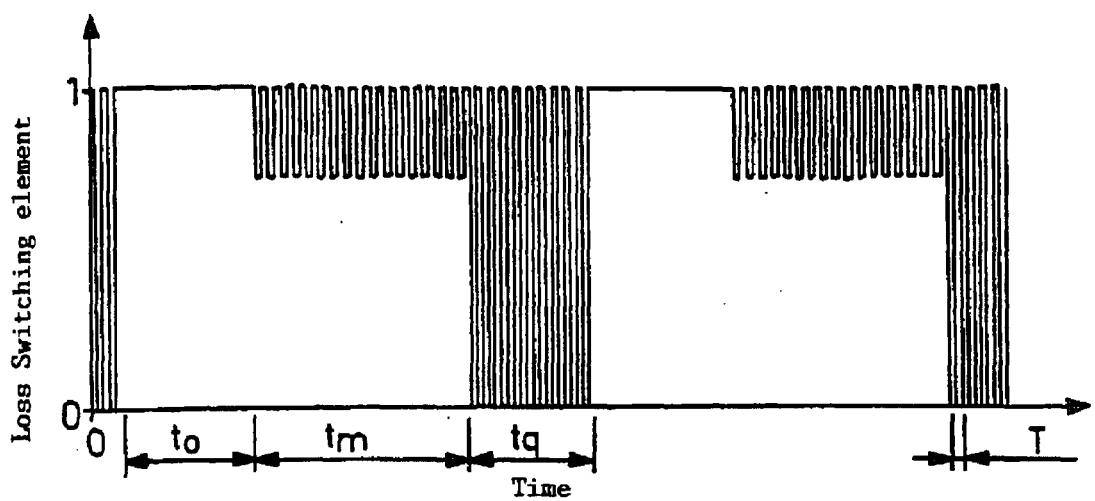
FIG. 18 shows a schematic illustration of a fifth possible mode of operation of the inventive laser amplifying system in pulsed operation and FIG. 19 shows a schematic illustration of a sixth possible mode of operation of the inventive laser amplifying system in pulsed operation.

First of all, as illustrated in FIG. 18*a*, any laser activity is suppressed during a period of time $t_o$ by way of quality switching due to an increase in the losses by means of the switching element 70 in order to obtain a high distribution inversion density in the laser-active medium 10.

Figure 18B:
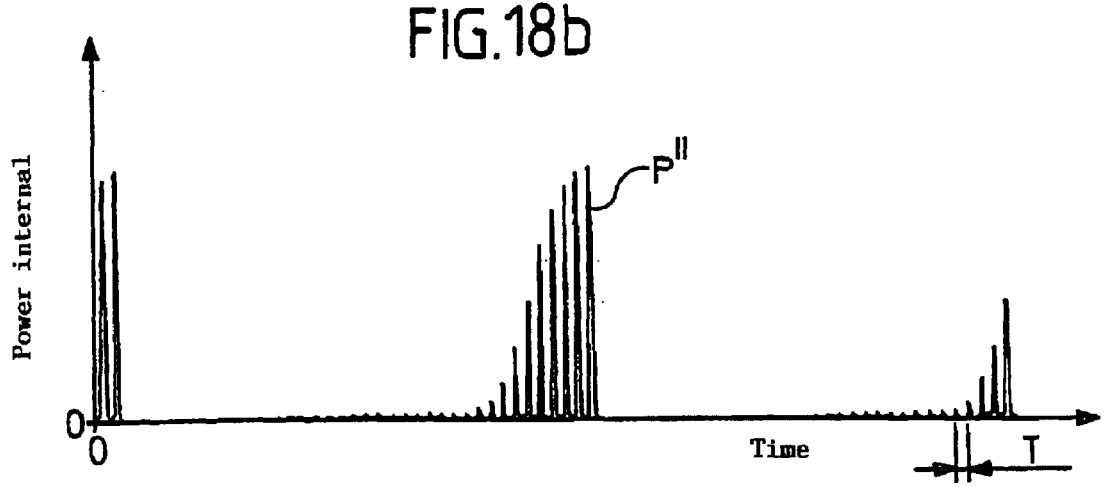
Figure 18C:
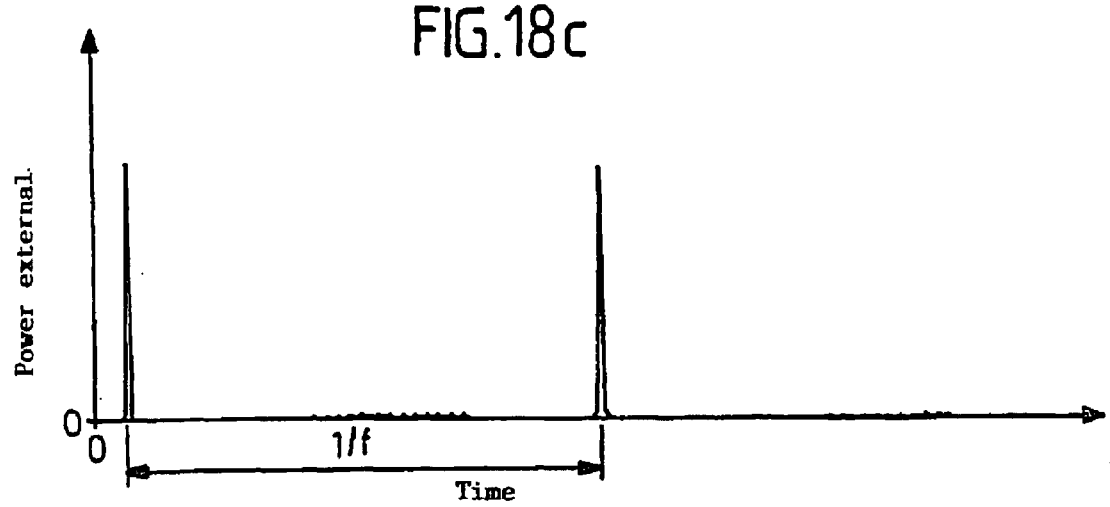

Subsequently, a modulation of the losses is carried out during a period of time $t_m$ in order to bring about a mode coupling of the modes being formed, wherein a very great reduction in the inversion density does not take place due to an incomplete reduction in the losses during the modulation. A modulation of the losses as far as minimum losses of the switching element 70 does not take place until during the period of time $t_q$ in order to build up a mode-coupled, propagating laser pulse P''' during as short a period of time as possible, as illustrated in FIG. 18*b*, this laser pulse then being coupled out at the end of the period of time $t_q$ due to the fact that the switching element 70 deflects the laser pulse P''' and, therefore, switches to maximum losses for the radiation field system 14, as is apparent from a comparison of FIG. 18*c* with FIG. 18*a*.

This mode of operation is also possible with a single switching element 70 which is preferably the acousto-optical modulator described in conjunction with the first embodiment in FIG. 1, with which the losses in the radiation field system 14 may be adjusted continuously over a certain range, wherein this acousto-optical modulator can, however, only be used when—as already explained—the propagating times are as long as possible, i.e., in the range of microseconds or at least 50 nanoseconds which can be achieved without any problem in the case of the inventive laser amplifying system.

In a sixth mode of operation of the inventive laser amplifying system, illustrated in FIG. 19, the laser amplifying system is operated as a regenerative amplifier.

Figure 19A:
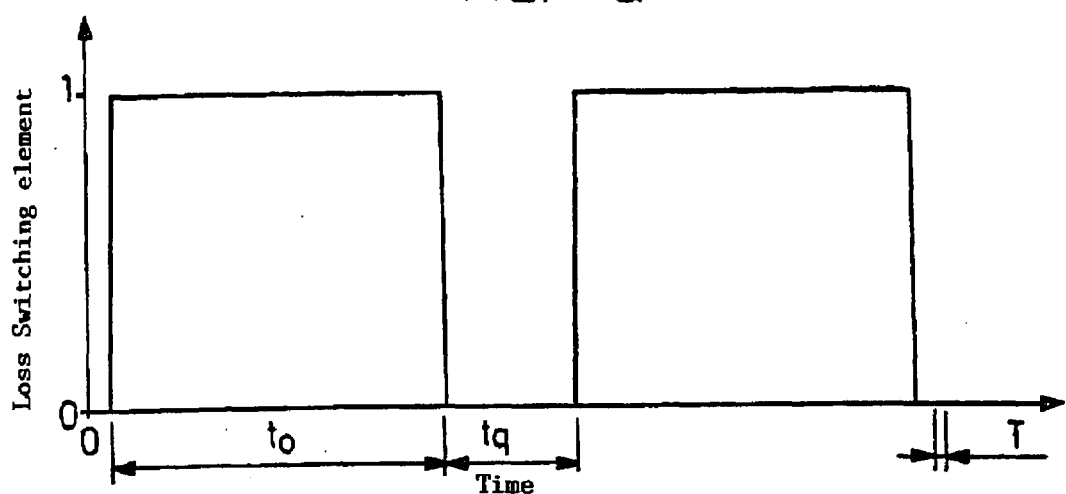
Figure 19B:
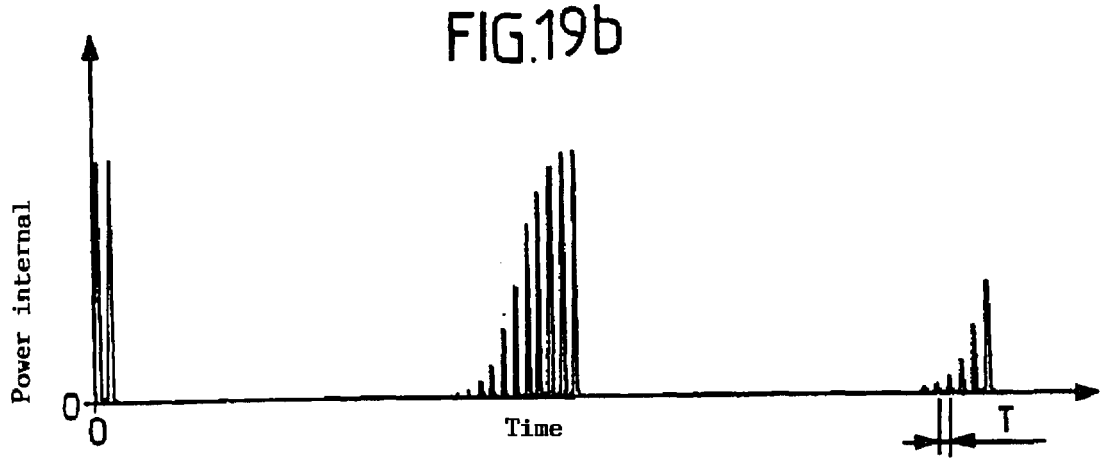
Figure 19C:
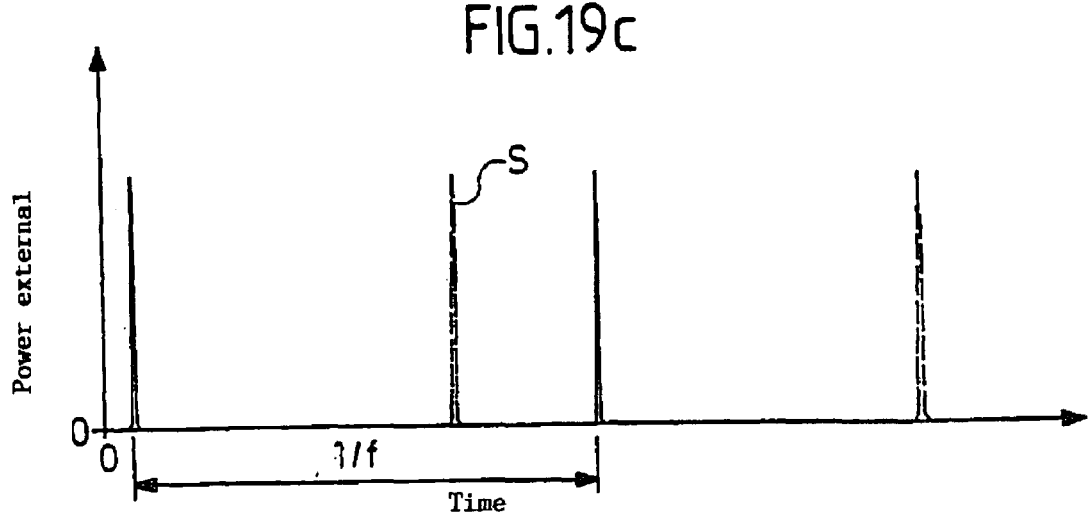

In this respect, as illustrated in FIG. 19*a*, the switching element 70 is switched to maximum losses first of all during a period of time $t_o$ so that as great an inversion density as possible is built up in the laser-active medium 10. Subsequently, as illustrated in FIG. 19*c*, a seed laser pulse of low energy is coupled in which, as illustrated in FIG. 19*b*, is amplified to maximum energy during the period of time $t_q$ due to multiple propagations in the inventive radiation field system 14 and, subsequently, coupled out at the end of the period of time $t_q$, wherein the switching element 70 again deflects the laser pulse and, therefore, switches to maximum losses in the radiation field system 14.

What is claimed is:

1. Laser amplifying system comprising a solid-state member having a laser-active medium, a radiation field system determined by an optical guide means for the radiation field and an actively switchable optical switching element arranged in the radiation field system for influencing the losses in the radiation field system, wherein the solid-state member is designed like a thin plate, the radiation field system comprises an incoming branch and an outgoing branch, said branches being coupled to one another, on the one hand, and, on the other hand, an amplifying radiation field being provided between them, said amplifying radiation field being formed from a plurality of intermediate branches extending between two optical beam reversing elements, said intermediate branches, for their part, all penetrating the solid-state member in a direction transverse to its flat sides and within an active volume area, the active volume area having in directions transverse to beam axes of the intermediate branches an extension corresponding at the most to three times the average extension of the radiation field cross sections of the volume sections of the intermediate branches located in the active volume area.

2. Laser amplifying system as defined in claim 1, wherein the actively switchable optical switching element is arranged outside the amplifying radiation field.

3. Laser amplifying system as defined in claim 2, wherein the actively switchable optical switching element is arranged in the incoming or outgoing branch of the radiation field system.

4. Laser amplifying system as defined in claim 1, wherein the radiation field system has at least two amplifying radiation fields and two beam reversing elements are associated with each amplifying radiation field.

5. Laser amplifying system as defined in claim 4, wherein different volume areas having a laser-active medium are associated with different amplifying radiation fields.

6. Laser amplifying system as defined in claim 1, wherein at least one transfer element acting on the intermediate branches between the beam reversing elements is associated with each laser amplifying field, said transfer element imaging the intermediate branches into an area of intersection, said branches overlapping with their radiation field cross sections at least by half in said area of intersection.

7. Laser amplifying system as defined in claim 6, wherein the transfer element is designed to reflect the intermediate branches.

8. Laser amplifying system as defined in claim 6, wherein the transfer element is designed as a transfer element acting in a collimating manner on the beam axes of the intermediate branches.

9. Laser amplifying system as defined in claim 6, wherein the transfer element is designed as a transfer element bringing the beam axes of the intermediate branches together twice in an area of intersection.

10. Laser amplifying system as defined in claim 1, wherein at least one of the beam reversing elements is designed as a single-reflection reflector.

11. Laser amplifying system as defined in claim 10, wherein both beam reversing elements are designed as single. reflection reflectors.

12. Laser amplifying system as defined in claim 10, wherein the intermediate branches impinge on the reflector in a surface area with their radiation field cross sections overlapping.

13. Laser amplifying system as defined in claim 1, wherein the optical guide means for the radiation field is designed in such a manner that the intermediate branches overlap with their volume sections penetrating the active volume area.

14. Laser amplifying system as defined in claim 1, wherein the optical guide means for the radiation field is designed in such a manner that the intermediate branches each have an approximately similar radiation field geometry in the active volume area.

15. Laser amplifying system as defined in claim 1, wherein the optical guide means for the radiation field is designed in such a manner that the beam axes of the intermediate branches penetrate a volume of intersection located in a spatial area comprising the active volume area, said volume of intersection being smaller than the active volume area by at least a factor of ten.

16. Laser amplifying system as defined in claim 15, wherein the spatial area has in every direction at the most an extension corresponding to double the maximum extension of the active volume area.

17. Laser amplifying system as defined in claim 1, wherein the solid-state member having the laser-active medium is arranged immediately in front of the beam reversing element, the intermediate branches overlapping on said beam reversing element in the surface area with their radiation field cross sections.

18. Laser amplifying system as defined in claim 1, wherein the optical guide means for the radiation field is designed in such a manner that the intermediate branches with the same beam propagation direction have an identical symmetry with an identical alignment of symmetry within the active volume area.

19. Laser amplifying system as defined in claim 1, wherein the optical guide means for the radiation field is designed in such a manner that the intermediate branches with approximately the same beam propagation direction have approximately the same phase curvature in the active volume area.

20. Laser amplifying system as defined in claim 1, wherein the optical guide means for the radiation field is designed in such a manner that intermediate branches with approximately the same beam propagation direction have conjugated surfaces located in a spatial area comprising the active volume area.

21. Laser amplifying system as defined in claim 20, wherein the spatial area has in every direction a maximum extension corresponding to double the maximum extension of the active volume area in this direction.

22. Laser amplifying system as defined in claim 1, wherein the optical guide means for the radiation field is designed in such a manner that a substantially afocal system results for the amplifying radiation field in the case of a pass from the active volume area through an intermediate branch back to the active volume area with the same direction of pass.

23. Laser amplifying system as defined in claim 1, wherein the optical guide means for the radiation field is designed in such a manner that a different intermediate branch with an imaging magnification of approximately one is formed in the spatial area from each of the intermediate branches.

24. Laser amplifying system as defined in claim 1, wherein the number of intermediate branches is adjustable due to adjustment relative to one another of the elements of the optical guide means for the radiation field defining the amplifying radiation field.

25. Laser amplifying system as defined in claim 24, wherein the number of intermediate branches is adjustable due to adjustment of one of the beam reversing elements relative to the other, stationarily arranged elements of the optical guide means for the radiation field.

26. Laser amplifying system as defined in claim 1, wherein the incoming branch extends between an end element of the optical guide means for the radiation field and one of the two beam reversing elements.

27. Laser amplifying system as defined in claim 1, wherein the outgoing branch extends between an end element of the optical guide means for the radiation field and one of the two beam reversing elements.

28. Laser amplifying system as defined in claim 1, wherein the incoming branch and the outgoing branch extend towards the same beam reversing element.

29. Laser amplifying system as defined in claim 1, wherein the incoming branch and the outgoing branch are coupled directly by means of at least one end element.

30. Laser amplifying system as defined in claim 29, wherein the at least one end element couples the outgoing branch and the incoming branch by way of reflection.

31. Laser amplifying system as defined in claim 1, wherein the radiation field system is designed such that laser radiation is able to pass through the radiation field system several times in the same direction of pass.

32. Laser amplifying system as defined in claim 1, wherein the radiation field system is designed such that laser radiation is able to pass through the radiation field system in opposite directions due to a reversal of direction in the incoming and/or outgoing branch.

33. Laser amplifying system as defined in claim 1, wherein the radiation field system is designed such that laser radiation is able to pass through it as often as required.

34. Laser amplifying system as defined in claim 1, wherein part of the laser radiation is adapted to be constantly coupled out in the radiation field system.

35. Laser amplifying system as defined in claim 34, wherein laser radiation is adapted to be coupled out by an element of the optical guide means for the radiation field.

36. Laser amplifying system as defined in claim 1, wherein laser radiation passes through the radiation field system for such a time until an active coupling out is brought about by means of the optical switching element.

37. Laser amplifying system as defined in claim 1, wherein the actively switchable optical switching element is a switching element influencing polarization.

38. Laser amplifying system as defined in claim 1, wherein the actively switchable optical switching element is a switching element diffracting radiation.

39. Laser amplifying system as defined in claim 38, wherein the actively switchable optical switching element is an acousto-optical modulator.

40. Laser amplifying system as defined in claim 1, wherein the solid-state member is cooled via a flat side.

41. Laser amplifying system as defined in claim 1, wherein the solid-state member is coupled to a heat sink.

* * * * *